(12) United States Patent
Zhou

(10) Patent No.: US 6,650,822 B1
(45) Date of Patent: *Nov. 18, 2003

(54) OPTICAL DEVICE UTILIZING OPTICAL WAVEGUIDES AND MECHANICAL LIGHT-SWITCHES

(75) Inventor: Xiaochuan Zhou, Ann Arbor, MI (US)

(73) Assignee: Xeotion Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,786

(22) Filed: Jul. 26, 1999

Related U.S. Application Data

(63) Continuation of application No. 08/960,512, filed on Oct. 29, 1997, now Pat. No. 5,953,469.
(60) Provisional application No. 60/029,497, filed on Oct. 29, 1996.

(51) Int. Cl.[7] .................................................. G02B 6/00
(52) U.S. Cl. .......................................... 385/147; 385/16
(58) Field of Search .............................. 385/16, 22, 23, 385/147; 359/630, 244, 247, 262; 369/109, 32, 44.37, 112, 121; 379/93.28

(56) References Cited

U.S. PATENT DOCUMENTS

| 3,871,747 A | 3/1975 | Andrews |
| 4,113,360 A | 9/1978 | Baur et al. |
| 4,640,592 A | 2/1987 | Nishimura et al. |
| 4,763,984 A | 8/1988 | Awai et al. |
| 4,822,145 A | 4/1989 | Staelin |
| 5,009,483 A | 4/1991 | Rockwell, III |
| 5,106,181 A | 4/1992 | Rockwell, III |
| 5,381,502 A | 1/1995 | Veligdan |
| 5,455,882 A | 10/1995 | Veligdan |
| 5,953,469 A | * 9/1999 | Zhou .......................... 385/22 |

FOREIGN PATENT DOCUMENTS

| EP | 675477 | 10/1995 |
| WO | WO 93/09454 | 5/1993 |

OTHER PUBLICATIONS

Ernest Stern, (1997) "Large–Area Micromechanical Flat–Panel Display," *Conf. Record Int. Display Res. Conf.* (Soc. For Inf. Display,, Toronto, Canada, Sep. 15–19–, 1997), pp. 230–233.

(List continued on next page.)

*Primary Examiner*—Euncha Cherrry
(74) *Attorney, Agent, or Firm*—G. Keneth Smith

(57) ABSTRACT

An optical device consists of one or more optical waveguides and mechanical light switches 30. When a light switch 30 is turned on, it extracts light beam 62a from a waveguide core 20 and redirect the light beam 62b into free space, it redirects an incoming light beam 80 from free space and injects the light beam 80a into the waveguide core 20, or it performs both functions at the same time, depending on specific applications. On and off states of a light switch 30 are achieved by pulling the light switch 30 into a close vicinity of the waveguide core 20 and by pushing the light switch 30 away from the waveguide core 20, respectively. An interactive fiat-panel display can be built based on this invention. A plurality of parallel channel waveguides forms a display panel. An array of light beams 62a, injected from an array light source 60, propagates along waveguide cores 20 until reaches a location where a light switch 30 is turned on. At this location, the light switch 30 redirects the light beams towards a viewer. An image is produced when the light switches 30 are turned on sequentially while the light-intensity distribution on the array light source 60 is synchronically updated. The panel display is capable of responding to an input optical signal by detecting an incoming light beam 80 from a light pen 100. An array of photodetectors 81 is used to identify the location of the incoming light beam 80 on the display panel and a computer is used to execute a corresponding action accordingly.

1 Claim, 21 Drawing Sheets

OTHER PUBLICATIONS

Paul Piska, (1992) "Electrostatically Actuated Optical Nanomechanical Devices," *SPIE 1793*, pp. 259–272.

Young W. Kim, (1992) "Micromechanically Based Integrated Optic Modulators and Switches," *Proc. Integrated Optics and microstructures, SPIE 1793*, p. 183.

J.R. Gilbert, (1995) "3D Coupled Electro–mechanics for MEMS: Applications of CoSolve–EM," *Proc. IEEE Micro Electro Mechanical Systems* (Cat. No. 95CH35754). pp. 122–127.

H. Terui et al. (1981) "Total Reflection Optical Waveguide Switching Through Dielectric Chip Motion," *Applied Optics*, vol. 20, No. 18, pp. 3152–3157.

* cited by examiner

OPTICAL DEVICE UTILIZING OPTICAL WAVEGUIDES AND MECHANICAL LIGHT-SWITCHES

CROSS REFERENCE TO RELATED CASES

This application is a continuation of U.S. patent application Ser. No. 08/960,512 filed on Oct. 29, 1997 now patented, U.S. Pat. No. 5,953,469, which claims a benefit of provisional application serial No. 60/029,497 filed on Oct. 29, 1996.

FIELD OF THE INVENTION

The present invention relates to optical devices, specifically, panel display, with interactive capabilities, which utilizes optical waveguides, mechanical light-switches, and linear-array light sources.

DESCRIPTION OF THE RELATED ART

Conventional television (TV) sets and computer monitors use cathode ray tubes (CRTs) as display devices. The CRTs are undesirably large, heavy, and utilize power inefficiently. Therefore, there is a genuine need to replace CRTs with thin, light weight and energy efficient flat-panel displays (FPDs).

Commercial FPD technologies include liquid crystal displays (LCDs), thin-film electroluminescence (TFEL) displays, plasma display panels (PDPs), field emission displays (FEDs), and light-emitting-diode (LED) matrix displays.

Transmissive matrix-LCDs dominate the current FPD market. This type of displays uses a backlight for illumination. These LCD devices are very inefficient. Before reaching a viewer, a light beam must pass through polarizer layers, liquid crystal layers, color filters, and some electronic component films. In the process, about 95% of the light energy is lost. Moreover, the fabrication processes, especially for active matrix LCDs (AMLCDs), are very complex and expensive. A high resolution AMLCD requires thousands of addressing lines and millions of transistors on a large substrate, therefore manufacturing is expensive. The production of AMLCDs relies on the use of sophisticated semiconductor processes. Particularly, expensive photolithography has to be used. As a result, the diagonal of an affordable display is limited.

Other FPD also suffer limitations. TFEL displays lack efficient blue phosphors and thus have low overall energy efficiency. PDP technology has been used for commercial production, however manufacturing cost is high and high energy-efficiency displays have yet to be demonstrated. FED technology potentially is more energy efficient than liquid crystal based displays, however, this potential has not yet been demonstrated. In addition, manufacturing cost of FEDs currently exceeds that of AMLCDs.

LED matrix displays are composed of pluralities of individual LEDs arranged in a matrix. Recent commercial availability of high-efficiency InGaN-based blue and green LEDs coupled with the existence of high performance AlGaAs- and AlInGaP-based red LEDs has made it possible to form high-brightness, full color LED panel displays. This type of display is presently limited to very large displays such as those used for stadium and outdoor advertisement applications. The main limitations of matrix LED technology include high cost and impractical manufacture of regular sized displays. The high cost is due to the necessity of using a large number of LEDs to make the displays. For example, a 1024×768 full-color display requires the use of 1024×768×3=2,359,296 LEDs. Such a display is made by assembling individual LEDs that are usually larger than a couple of millimeters in diameter. It is difficult and costly to make and assemble smaller LEDs. A new approach must be sought if the high performance LEDs are to be used in low-cost flat-panel displays. The present invention provides such an approach.

A less known but viable display technology uses optical waveguides to convey light from a small light source onto a large display screen. Optical fiber projectors (Awai et al., U.S. Pat. No. 4,763,984, (1988)) and stacked planar waveguide projectors (Veligdan, U.S. Pat. No. 5,381,502 (1995) and U.S. Pat. No. 5,455,882 (1995)) are magnifying projectors that channel light images from a small but intense light-image source to a large screen. The construction of an optical fiber projector is fairly complex, due to a huge number of fibers to be assembled. A stacked planar waveguide projector requires an expensive laser scanner or digital micromirror array combined with a sophisticated focusing system as the video source and is, therefore, high cost. In addition, while these two displays can be made relatively compact, neither of them is a true flat-panel display.

Waveguide-based flat-panel displays use planar and channel waveguides (Andrews in U.S. Pat. No. 3,871,747 (1975)). Most of the display devices of this category involve parallel channel waveguides assembled on a flat substrate to form a display screen. Light switches are placed on top or inside the channel waveguides and are distributed across the display screen. Light beams are first injected into the channel waveguides from the side and are then extracted by the light switches at appropriate locations on the display screen to form an image. The main differences among various approaches are the underlying light-extraction mechanisms and the constructions of the light switches. Rockwell (U.S. Pat. No. 5,106,181 (1992) and U.S. Pat. No. 5,009,483 (1991)) described methods of using electro-optical effect, thermal-optical effect, and acoustic effect to alter the optical confinement property of waveguides so as to extract light. Staelin et al. (U.S. Pat. No. 4,822,145 (1989)), disclosed a waveguide display using liquid crystals as the cladding materials of waveguides. By applying an electrical field, one may increase the refractive index of the liquid-crystal cladding layer and, therefore, permit light to escape in a controlled fashion from the waveguides. Nishimura, (U.S. Pat. No. 4,640,592 (1987)), describes a liquid-channel waveguide display. Heat is applied to local regions of the waveguide channels and bubbles are produced in the liquid. These bubbles cause light scattering out of the waveguides. While all these methods can, in principle, extract light out of waveguides, they suffer from low extraction coefficient, high-energy consumption, sluggishness, and/or high manufacturing cost.

Recently, a micromechanical flat-panel display was proposed by Stern ("Large-area micromechanical flat-panel display," Conf. Record 1997 Int. Display Res. Conf. (Soc. For Inf. Display, Toronto, Canada, Sept. 15–19, 1997), pp. 230–233). The display screen consists of a planar waveguide, on which a matrix of electrostatically driven micromechanical light switches are placed. Fluorescent light tubes are used as the light source of the display. The light extraction from the planar waveguide is achieved by light tunneling from the waveguide into the light switches due to a close proximity the light switches to the waveguide surface (Kim et al. "Micromechanically based integrated optic modulators and switches," Proc. Integrated Optics and Microstructures, SPIE 1793, 183 (1992) and Piska et al.

"Electrostatically actuated optical nanomechanical devices," Proc. Integrated Optics and Microstructures, SPIE 1793, 259–272 (1992)). There are several inherent limitations in the proposed embodiment that will prevent the production of high-quality, full color, and energy efficient displays.

First, shadow and ghost images will be inevitable because along each light propagation direction several light switches could be activated at same time and shadows of upper stream pixels would be cast onto down stream pixels.

Second, optical efficiency is inherently low. In order to achieve an acceptable uniformity or to minimize shadow images light extraction at each light switch has to be very low so that the light flux throughout the waveguide is not significantly attenuated. Consequently, only a small portion of the light inside a waveguide can be utilized.

Third, full-color and gray-scale displays will be difficult. Colors are achieved by using multilayer band-pass filters coated on the waveguide. The complexity and cost of depositing such filters on closely spaced areas is high. Gray scales are achieved by using area weighting and temporal weighting methods. The area weighting control uses a plurality of light switches of varied sizes on each pixel. A gray scale is obtained by turning on a number of light switches that add up to a total area proportional to the gray scale. A large number of light switches must be used on each pixel in order to achieve decent gray scales. Temporal weighting control requires either a line-scan or an active matrix-addressing scheme. A line-scan with gray-scale control demands a switching time of nano-seconds. It is not clear, at this time, whether such a short switching time can be achieved with a relatively large (several hundred micrometers across) electromechanical switch. The use of an active matrix will significantly increase the cost of the display.

Therefore, there exists a need for an inexpensive, simple, energy efficient, high quality, fill color FPD that can be manufactured in sizes ranging from several inches to tens of feet.

Furthermore, none of the aforementioned FPD technologies has a low-cost and high-precision build-in interactive capability. In particular, none of the previously described FPDs can be used as a scanner that would allow one to easily convert printed materials into electronic documents.

SUMMARY OF THE INVENTION

This invention relates to a waveguide based optical device that is simple to construct, requires low power consumption, allows the formation of video images of good quality and high resolution, and has interactive capabilities. The present invention relates to an optical relay device comprising:

(a) an optical waveguide having first end constituting a single-terminal optical port and a front side constituting a multiple-terminal optical port;

(b) a predetermined number of light switches in proximity to said optical waveguide, said light switches containing optical means for reflecting light waves;

(c) finite and changeable gaps between said light switches and said waveguide; and (d) means for changing said gaps thereby actuating said light switches and relaying optical signals between two said ports.

The present invention also relates to an optical display device comprising (a) an optical waveguide plate including a predetermined number of optical waveguides, said optical waveguides having a first end and a second end capable of receiving light waves;

(b) a predetermined number of light switches in proximity to said optical waveguides, said light switches involving optical means for redirecting light waves;

(c) finite and changeable gaps between said light switches and said optical waveguides;

(d) means for changing said gaps thereby actuating said light switches;

(e) at least one light source consisting of an array of light emitting elements, said light source being coupled with said optical waveguides through at least one end of said optical waveguides, said light emitting elements emitting light waves of controllable intensities; and (f) control means, including control circuits, for producing images by controlling actuation of said light switches and light emission from said light source.

The present invention also relates to a method for displaying an image comprising:

(a) emitting an array of light waves from an array light source into an optical waveguide plate containing a plurality of optical waveguides, said array light source containing a plurality of elements that emit light waves wherein the light emission from each said element can be controlled;

(b) actuating a light switch such that said light switch is moved into proximity to said optical waveguide thereby extracting said light waves from said optical waveguides into said light switch;

(c) redirecting said light waves for viewing; and (d) coordinating actuation of said light switches with light emission of said array light source such that a light image is formed.

The present invention solves the problems of low light extraction efficiency, high-energy consumption, image shadow, slow speed, and high manufacturing cost of prior art displays.

The foregoing merely summarizes certain aspects of the present invention and is not intended, nor should be construed, as limiting the invention in any manner. All patents and publications cited herein establish the state of the art and are hereby incorporated by reference in their entirety.

DETAILED DESCRIPTION OF INVENTION

Construction and Operations of the Disclosed Display System

Figure 1:
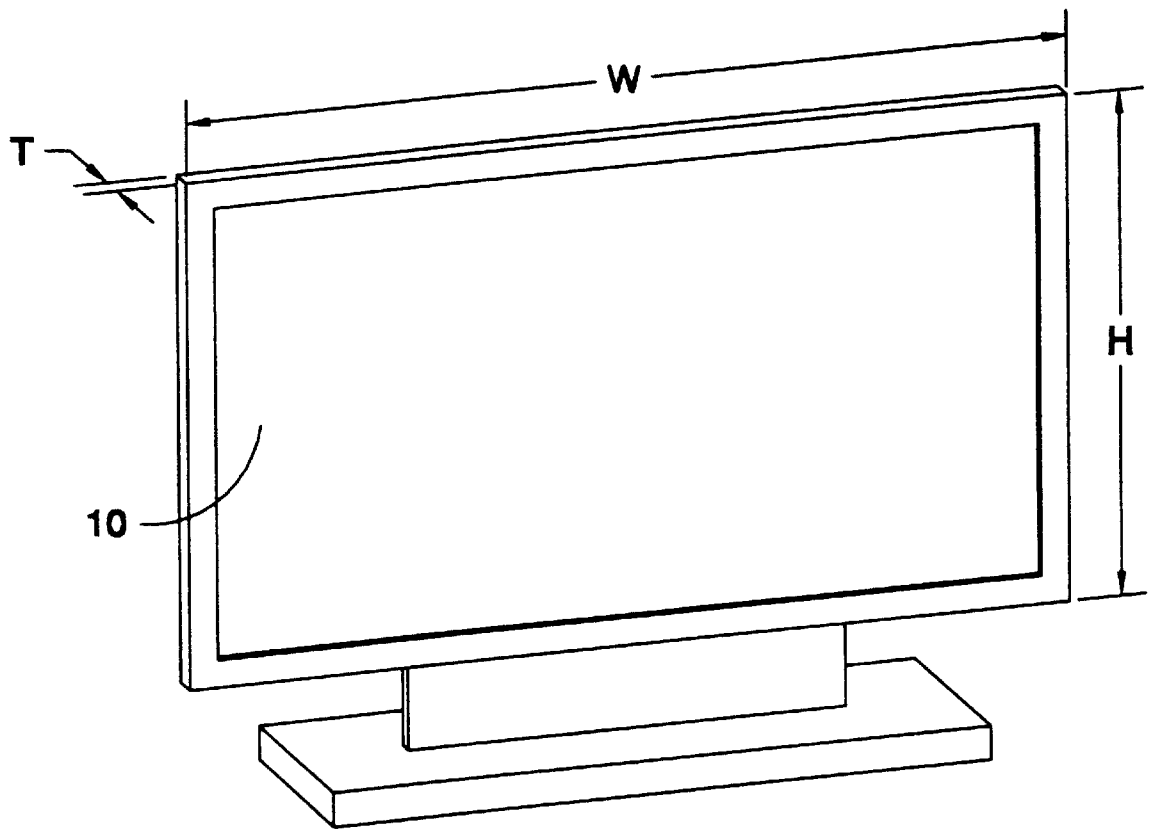
FIG. 1 is perspective view of a panel display.

Illustrated in FIG. 1 is a perspective view of a panel-display set consisting of a display screen 10, constructed by using waveguides and electromechanical light switches as described below. Preferably, the display of the present invention has a thickness T much smaller than its width W and height H.

Figure 2:
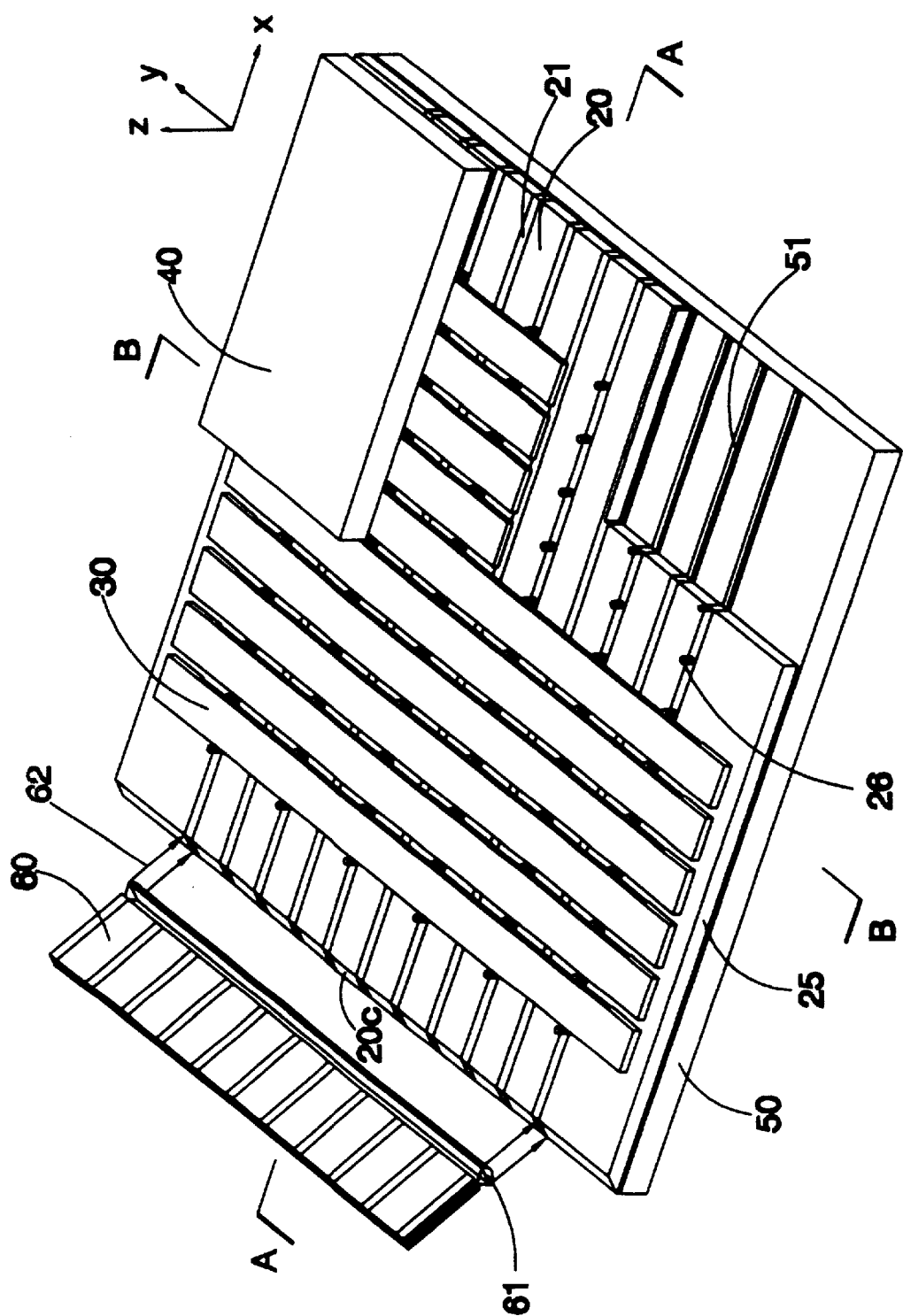
FIG. 2 is an exploded schematic view of a display assembly that embodies the present invention.

A preferred embodiment of the waveguide panel display of this invention is schematically illustrated in FIG. 2. The display is composed of a light source 60, a micro-lens 61, a optical waveguide plate 25, a plurality of light switches 30, a front plate 50, and a back plate 40. The light source 60 is constructed as a linear array, in which pluralities of light elements are placed one next to each other. For a full color display, each element of the linear array is composed of three sub-elements of red, green and blue (RGB) colors. A micro-lens 61 may be used to facilitate light coupling from the light-source 60 into waveguide cores 20 of the optical waveguide plate 25. The waveguides used in this invention are optical devices that confine the propagation directions of light waves. The optical waveguide plate 25 consists of a plurality of waveguide channels consisting of waveguide cores 20 and claddings 21, with the refractive index of the waveguide cores 20 higher than that of the claddings 21. Each waveguide core 20 is aligned with one element of the light source 60 array. The optical waveguide plate 25 is sandwiched between a front plate 50 and a back plate 40. Spacers 26, 51, located in the cladding 21 regions of the optical waveguide plate 25, are used to separate the optical waveguide plate 25 from the front and the back plates 50, 40, respectively. Light switches 30 are constructed as suspended beams and are placed in a free space between the optical waveguide plate 25 and the back plate 40. A light switch of this invention is an optical device that can be turned on and off. When turned on, the light switch either extracts light waves from a waveguide or facilitates light waves to enter a waveguide, depending on the origin of the light waves. When turned off, the light switch has no or little effect on light waves inside a waveguide. The sizes, materials, and the relations of the various parts of the disclosed display will become clear as the individual components and the operations of the device are described.

Figure 3:
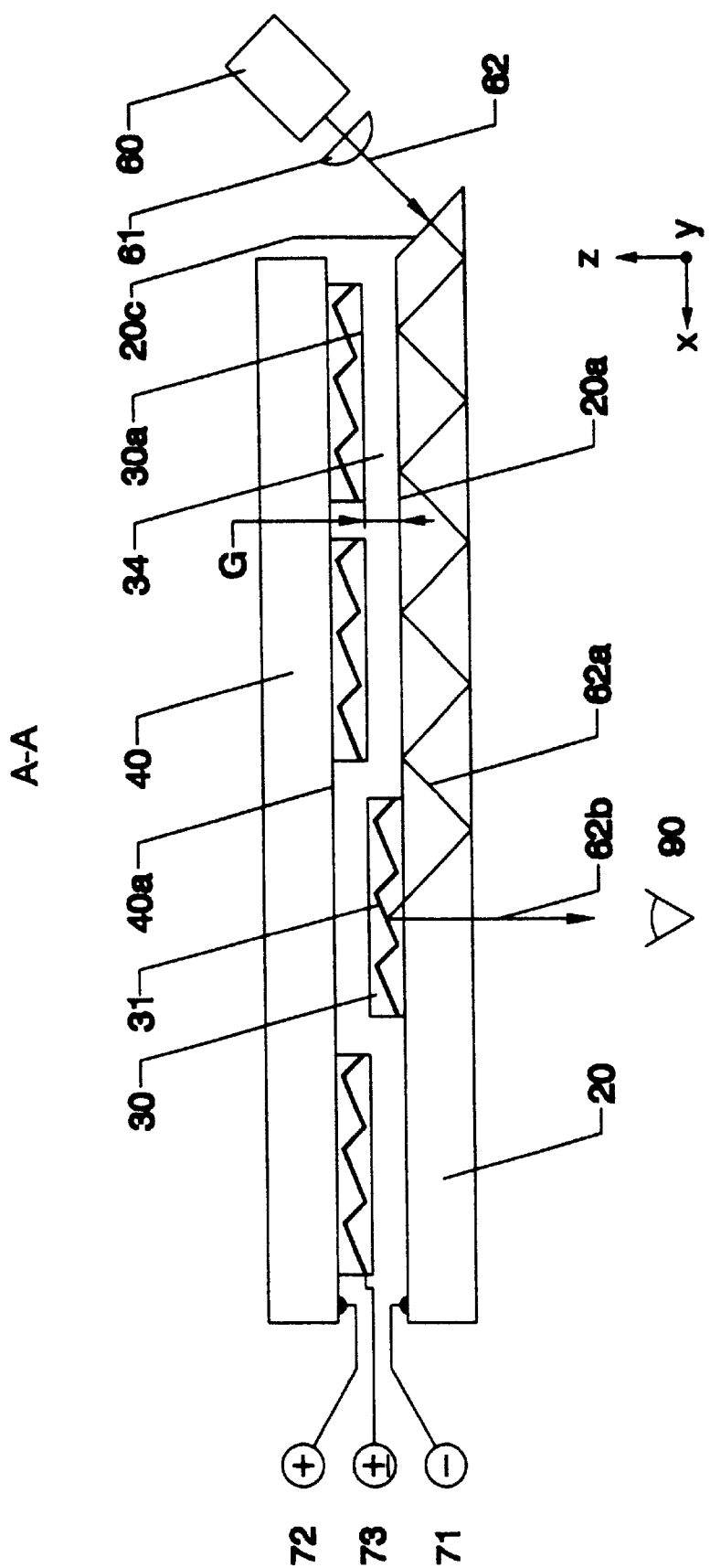
FIG. 3 is a cross-section view through the device in FIG. 2 along A—A plane showing the operational principle of a waveguide panel display according to the present invention.

FIG. 3 shows a z-x cross-sectional view of FIG. 2, with the omission of the front plate 50. A light beam 62, emitted from a light source 60, is coupled into a waveguide core 20 through a lens 61 to a waveguide end 20c. Inside the waveguide core 20, the light beam 62a is confined in lateral y and z directions but is allowed to propagate freely along longitudinal x direction until it reaches a location where a light switch 30 is on. The "on" and "off" states of the light switch 30 are determined by the width G of a gap 34 between the front surface 30a of the light switch 30 and the back surface 20a of the waveguide core 20. When G is large, as compared to the wavelength of the light beam 62a (for example G>2×wavelength), the light beam 62a propagates along the waveguide core 20 without interference. In this position, the light switch 30 is considered to be "off" since little or no light is extracted from the waveguide due to the proximity of the light switch. When the light switch 30 is brought sufficiently close to the waveguide core 20 (i.e.

when G is small, for example G<wavelength/10), the light beam 62a penetrates or tunnels through the gap 34 and enters the light switch 30. In this position, the light switch 30 is "on" since the light or at least a portion thereof is extracted from the waveguide. After entering the light switch 30, the light beam 62a is reflected by an embedded mirror reflector 31, passes back through the waveguide core 20 on its trajectory 62b to the front of the display, and then reaches a viewer 90. An image is formed when the light switches 30 are turned on one at a time in a sequential fashion while the array light source 60 is updated synchronically. The overlapping area between a waveguide core 20 and a light switch 30 defines a pixel. As shown in FIG. 2, each light switch 30 is a suspended beam spanning the entire display screen. Therefore, when one light switch is turned on the entire line is turned on. For full-color display, the color and brightness of each pixel along the line are determined by the color and the brightness of a light-source element that is coupled with the corresponding waveguide core 20. In a preferred mode, the light source 60 is an LED array, each element comprising red, green and blue (RGB) sub-elements. Color and brightness of the RGB sub-elements are controlled by using either current or pulse-length modulation.

As compared to the previous art, the present invention significantly reduces the number of light switches required for a display of same resolution. The present invention need not add light switches to perform color and gray-scale controls. In addition, in the present invention, line and column signals are electrical and optical signals, respectively, therefore, they are completely decoupled and there is no need for the use of complicated multiplex and active-matrix addressing schemes. With the use of a simple line-scan-addressing scheme, the present invention completely avoids any shadow or ghost image problems. Moreover, energy efficiency of the disclosed display is inherently high because color and brightness are controlled directly by the electrical energy supplies to the light source. As will be described in detail later, light switches and waveguides of this invention can be designed and built such that light waves in the waveguides are almost if not completely extracted for viewing.

In a preferred embodiment of the present invention, electrostatic forces actuate the light switches 30. Electrostatic forces may be produced by applying voltage biases 71, 72, and 73 onto a waveguide surface 20a, a back plate surface 40a, and mirror reflector 31, respectively, as shown in FIG. 3. Conductive films may be deposited on the waveguide surface 20a and the back plate surface 40a so that voltage biases can be applied. The detailed structures of such conductive films are described infra. The mirror reflector 31 embedded in the light switch 30 is made of a metal film, therefore the voltage bias 73 can be applied thereto.

Figure 4A:
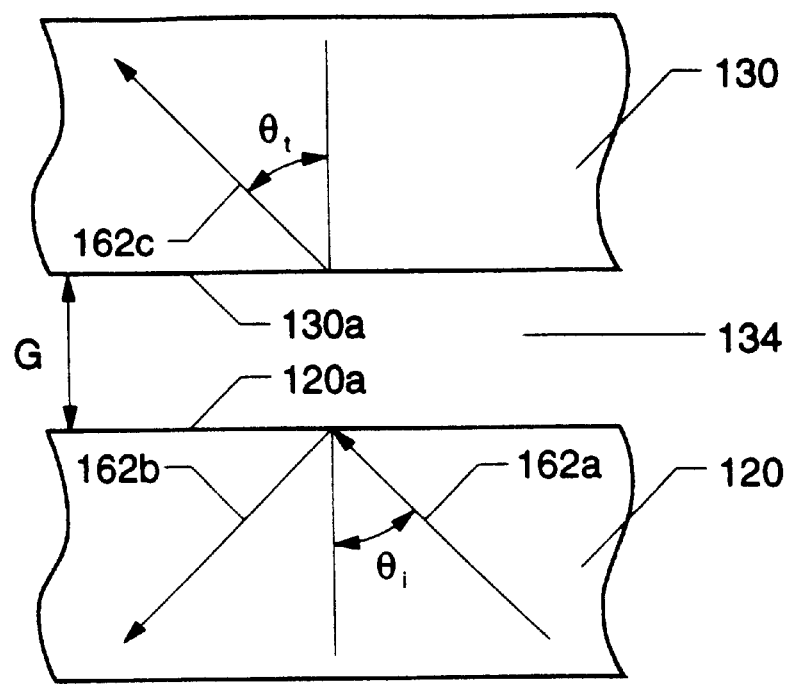
FIG. 4A illustrates light tunneling from one medium through an air gap into another medium.
Figure 4B:
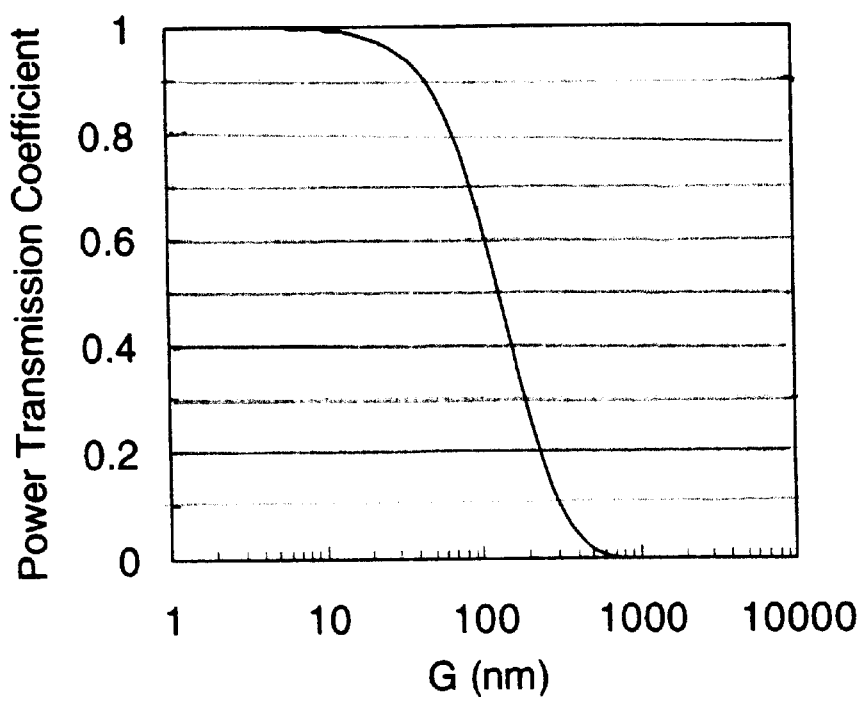
FIG. 4B shows the power transmission coefficient of a tunneling light as a function of an air gap. Following parameters were used in the calculation: green light with a wavelength of 520 nm, refractive index of 1.52 for both media, and incident angle of $\theta_i = 45°$.

The light-extraction mechanism of the light switches of this invention is based on the principle of frustrated total-internal-reflection (Syms et al. *Optical Guided Waves and Devices*, McGraw-Hill, London, (1992)). FIGS. 4A and 4B illustrate the mechanism. FIG. 4A shows two dielectric media 120 and 130 being separated from each other by an air gap 134. The first medium 120 is analogous to a waveguide core 20 and the second medium 130 is analogous to a light switch 30 as referring to FIG. 3. An incident light beam 162a would be totally reflected at the surface 120a of the first medium 120 if the incident angle $\theta_i$ is greater than a critical angle. The critical angle is defined as $\theta_c = \sin^{-1}(n_3/n_1)$, where $\theta_c$ is the critical angle, $n_1$ is the refractive index of the first medium 120, and $n_3$ is the refractive index of air. Assuming that the first medium 120 is glass with a refractive index $n_1=1.52$ and that air has a refractive index $n_3=1$, we have a critical angle $\theta_c=41.1°$. Wave theory of optics predicts that even when the incident angle is larger than the critical angle, i.e. $\theta_i > \theta_c$, there exists an evanescent field outside of the surface 120a of the first medium 120. Therefore, when the second medium 130 is brought sufficiently close to the surface 120a of the first medium 120, the evanescent field will have a significant amplitude at the front surface 130a of the second medium 130 thus light beam 162c enters the second medium 130. In this case, the condition for the total internal reflection of the incident light beam 162a in the first medium 120 is frustrated and light tunnels through the air gap 134 between the two media 120 and 130. The proportion of the light tunneling through the air gap 134 is a function of the gap width G, the refractive index of the first medium 120, the refractive index of the second medium 130, the incident angle $\theta_i$, and the wavelength of the light beam 162a. This proportion can be calculated by those who are skilled in the art of optics.

FIG. 4B shows a power transmission coefficient as a function of the gap G between the two media 120 and 130. The power transmission coefficient is defined as the proportion of the light tunneling through the air gap 134. The plot in FIG. 4B was derived based on the following assumptions: the incident light 162a has a wavelength of 520 nm (green) and an incident angle $\theta_i=45°$, the first and the second media (120 and 130) are made of a same type of glass materials with a refractive index of $n_1=n_2=1.52$. According to FIG. 4B, when $G \leq 10$ nm, more than 99% of light tunnels through the air gap 134. When $G \geq 1000$ nm, less than 0.01% of light tunnels through the air gap 134. Clearly, by changing the air gap 134 between the two media 120 and 130, one may construct an effective light switch.

The mechanical light switch of the present invention produces an extremely high light-extraction efficiency. More than 99% of the light can be extracted from a waveguide into the light switch. By taking into account Fresnel-reflection losses, which occur when a light beam passes through dielectric interfaces, close to 90% of the light waves in a waveguide can be extracted into a free space and be delivered to a viewer. The efficiency can be further improved by proper utilization of anti-reflection coatings on the front plate 50 of a panel display device. The selection and application of the anti-reflection coatings is a well-known procedure to those skilled in the art (Michael Bass and Eric W. Van Stryland, "Handbook of Optics: Fundamentals, Techniques, and Design" Volume 1, 2nd Edition, McGraw Hill, New York 1994).

Waveguides

Figure 5A:
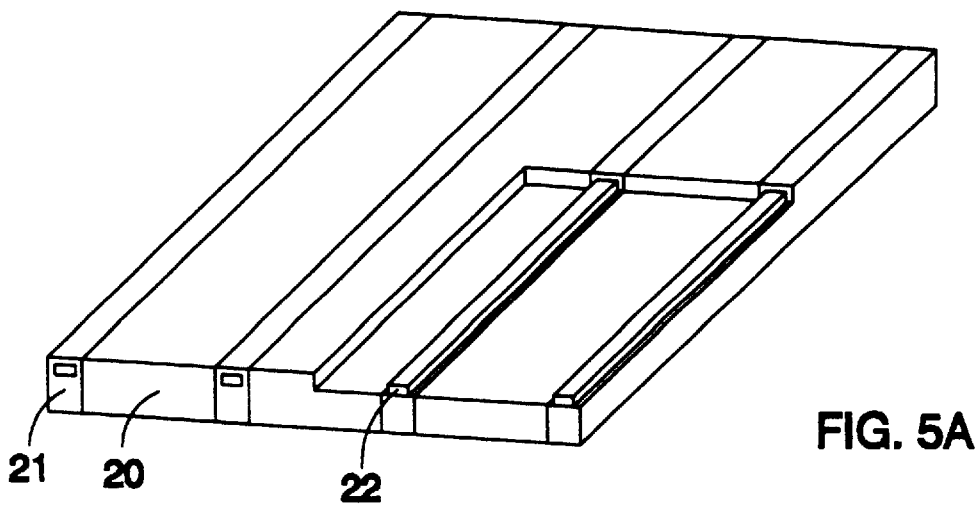
FIG. 5A is an exploded perspective view of a channel-waveguide assembly containing strip electrodes in cladding regions.
Figure 5B:
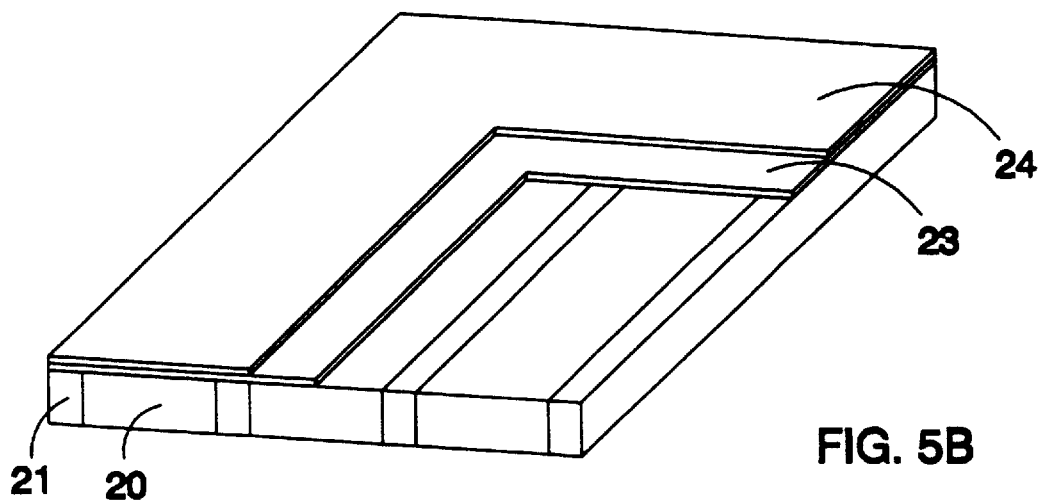
FIG. 5B is an exploded perspective view of a channel-waveguide assembly containing a planar electrode on surface of waveguides.
Figure 5C:
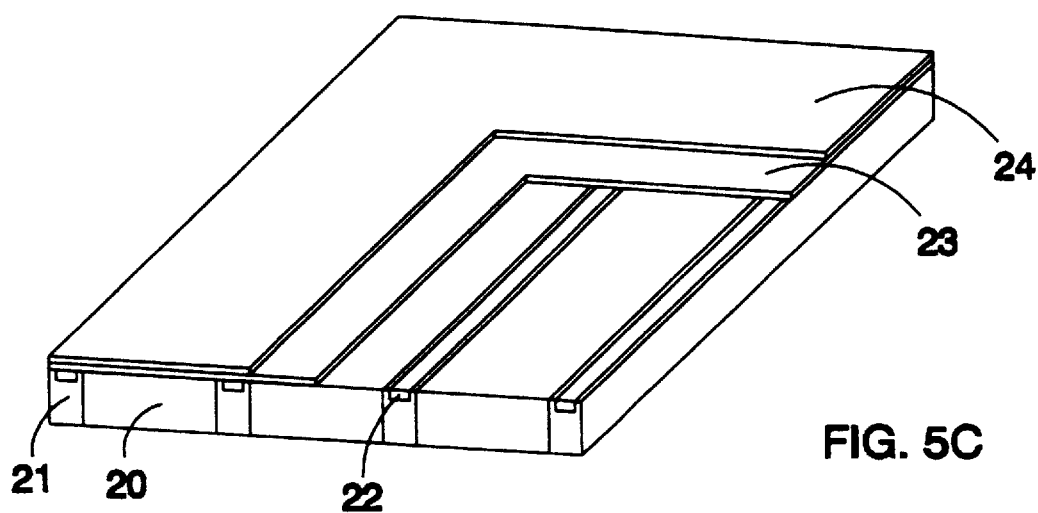
FIG. 5C is an exploded perspective view of a channel-waveguide assembly containing a planar electrode on the surface of waveguides and conductor strips in cladding regions.

FIGS. 5A through 5C illustrate three embodiments of channel waveguide assemblies. In general, waveguide channels are made of waveguide cores 20 and side claddings 21. The refractive index of the waveguide cores 20 should be higher than that of the claddings 21. The waveguide cores 20 and the claddings 21 are made of optical quality glasses, optical quality plastics, aerogels, or any other appropriate materials well known and available for the purpose of transmitting light. The differences among three waveguide embodiments are the ways to implement conductive electrodes for achieving desired electrical and optical performance of a complete display system.

In the embodiment shown in FIG. 5A conductor strips 22, embedded into claddings 21, are used as waveguide electrodes. The conductor strips 22 are preferably made of highly conductive metals. They can be single layer metals, such as aluminum, copper, silver, or gold. They can also be multilayer metals for improved adhesion to the cladding materials and for the ease of making contact with a driving circuit. The composition of the multilayer films depends on the composition of the cladding materials and the desired film properties. For example, if the claddings 21 are made of a polymer material, a sandwiched Cr/Au/Cr metallic film will likely provide a good adhesion to the polymer surface and have a high conductivity. It should be noted that the conductor strips 22 are covered with an insulator, which is, preferably, the same dielectric material as that of claddings 21. The insulator prevents direct contact between the conductor strips 22 and the bottom surface 30a of a light switch 30 (FIG. 3). Such a contact may cause charging of the light switch surface 30a, which, in turn, would result in a screening of the actuating potential and the return of the light switch 30.

The main advantage of the embodiment shown in FIG. 5A, as compared with the other two embodiments is that there is no need for additional thin-film materials on the surface of waveguide cores 20. Additional materials, if not applied properly, could cause optical attenuation in the channel waveguides as a result of optical adsorption and interference effects. In the embodiment displayed in FIG. 5A, care must be taken to ensure that the conductor strips 22 are wide enough so that an electrostatic force between the conductor strips 22 and a light switch 30 (FIGS. 2 and 3) is strong enough to pull the light switch 30 into contact with waveguide surface 20a. The strength of the electrostatic force is proportional to the width of the conductor strips 22 and to the applied bias voltage. An adequate width of the conductor strips 22 should allow the light switches 30 to be pulled in within certain voltage limit of an applied driving circuit. Those of skilled in the art may estimate the width by using theoretical simulations (See for example J. R. Gilbert, R. Legtenberg, and S. D. Senturia, "3D Coupled Electromechanics for MEMS: Applications for CoSolve-EM," Proceedings IEEE Micro Electro Mechanical Systems 1995).

FIG. 5B shows a second embodiment of a channel waveguide assembly. In this embodiment, a transparent conductive film 23 is used as the waveguide electrode. The transparent conductive film 23 is preferably made of indium-tin oxide (ITO) while other transparent conductive materials such as doped zinc oxide may also be used. Low optical absorption and high electrical conductivity of the thin film are very important for achieving a high optical efficiency, low power consumption, and fast switching speed in the display device of the present invention. An insulating thin film 24 may be deposited on top of the transparent conductive film 23 to prevent a direct contact between the transparent conductive film 23 and the bottom surface 30a of light switches 30 (FIG. 3). The insulating material can be chosen from a wide selection of dielectrics, such as $SiO_2$ and phosphor doped $SiO_2$. The thickness of the transparent conductive film 23 and the insulating thin film 24 is in the range of thousands of Angstroms. The exact thickness can be optimized with theoretical calculations by those of skilled in the art (See for example G. R. Fowles, "Introduction to modem optics" Dover Publications, New York, 1989). The thickness of the films should be adjusted so as to balance the optical attenuation of the waveguide and electrical conductivity of the waveguide electrode. The main advantage of the embodiment shown in FIG. 5B is that the waveguide-electrode area is maximized and, therefore, light-switch actuation can be achieved at the lowest possible voltage. In addition, this embodiment is the simplest one to fabricate of the three embodiments shown in FIG. 5. Only standard deposition processes are required in the making of the waveguide electrodes of FIG. 5B.

FIG. 5C shows a third embodiment of a channel waveguide assembly. Conductor strips 22 are added in cladding 21 regions. The conductor strips 22 are in electrical contact with a transparent conductive film 23. These conductor strips 22 are preferably made of highly conductive metals, such as aluminum, copper, silver, or gold. They are constructed either as single-layer or as multi-layer films. Multilayer structures, if properly constructed, may provide the advantage of improved adhesion to the cladding 21 materials and to the transparent conductive film 23. A transparent conductive film 23 and an insulating thin film 24 are applied on the surface of the waveguide assembly. The construction principles and the materials selected for these thin films are the same as previously described in FIG. 5B. The main advantage of this embodiment is an enhanced conductivity for the waveguide surface electrode with a maximized electrode area. This will result in a lower driving voltage, lower power consumption, and a faster speed of light switches 30 (FIG. 3).

Light Switches

Figure 6A:
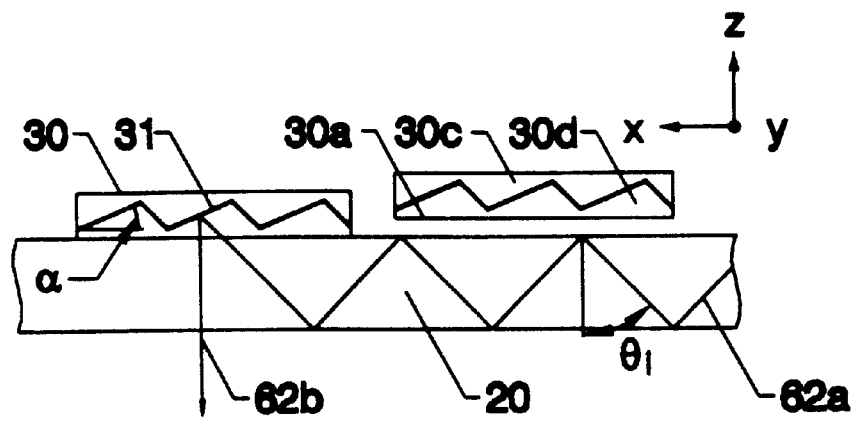
FIG. 6A illustrates a cross-sectional view of light switches with flat reflectors, which produce straight light beams.
Figure 6B:
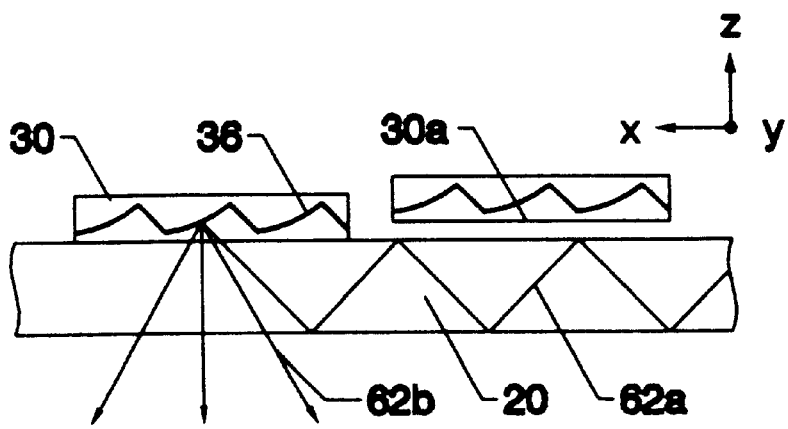
FIG. 6B illustrates a cross-sectional view of light switches with curved reflectors, which produce divergent light.
Figure 6C:
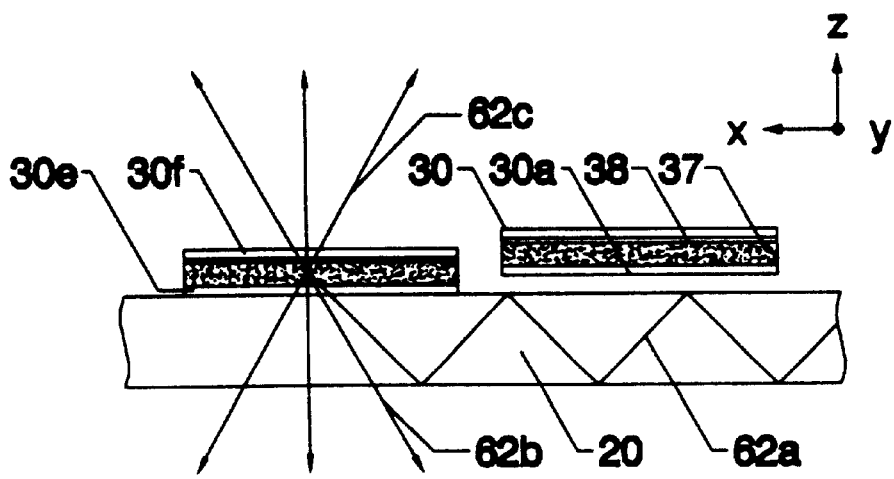
FIG. 6C illustrates a cross-sectional view of light switches with light diffusers, which produce scattered light in all directions.

FIGS. 6A through 6C illustrate x-y cross-sectional views of three embodiments of the light switch 30 shown in FIG. 2. These light switches differ from each other in the manner in which light, extracted from waveguides, is redirected. It should be understood that this invention is not limited to these three types of light switches as long as the operation principle of the light switches falls within the spirit of this invention.

FIG. 6A shows a preferred embodiment. In this embodiment, the light switch contains reflectors 31 having segmented flat-mirror facets. The segmentation of the reflectors 31 reduces the thickness of the light switches 30. Thin light switches 30 are preferred for lowering actuation voltages. The reflectors 31 are preferably made of highly optically reflective and highly electrically conductive metallic materials, such as silver and aluminum. The surface of the reflectors 31 is preferably optically smooth. The bulk portion of each light switch 30 consists of lower and upper halves 30c, 30d, which are made of transparent materials, such as glasses, sol-gel materials, and/or polymers. Detailed designing rules for the geometric dimensions and the material properties of the reflectors 31 and the bulk portion of the light switches 30 will be described infra. The main advantage of this embodiment is the high light extraction efficiency. With the use of high quality mirror reflectors 31, more than 95% of the light 62a that enters the light switch 30 can be reflected.

FIG. 6B illustrates a second embodiment of the light switch 30. Curved reflectors 36 produce divergent light 62b. The advantage of this type of reflector is its ability to generate wide viewing angles for the display. The reflectors 36 may be curved along any or all direction to produce a desired radiation pattern. The exact geometric shape of the reflectors 36 can be determined either experimentally or theoretically by those who are skilled in the art to achieve a desired radiation pattern. Reflector and bulk portion materials are the same as those used in the embodiment shown in FIG. 6A.

FIG. 6C shows a third embodiment of the light switch 30. Light diffusers 37 are used to produce scattered light 62b, 62c. The use of the light diffusers 37 has the advantage of producing very wide viewing angles. In addition, this type of light switch 30 allows the fabrication of a unique semitransparent-double-sided display. To make such a display, transparent conductive films, such as ITO, should be used as the electrodes 38 in the light switches 30. The ambient light that transmits through the space between adjacent light switches 30 creates a semitransparent effect. The forward and the backward scattered lights 62b and 62c result in the double-sided nature of the display. This type of display creates an attractive visual sensation and can find market in many applications, such as advertisement displays and entertainment. If a single-sided display is desired, a metal film should be used as the light switch electrode 38 on the backside of the light diffusers 37. The metal film serves as an electrical conductor as well as a light reflector. Preferably, the light diffusers 37 are made of a white pigment mixed in a transparent material. The transparent material is, preferably, the same substance as the one that is used in front and back layers 30e, 30f of the light switches 30. The material can be chosen from various glass, sol-gel, and polymer materials. The front layer 30e provides a smooth front surface 30a and the back layer 30f provides electrical insulation for the electrode 38.

Figure 7A:
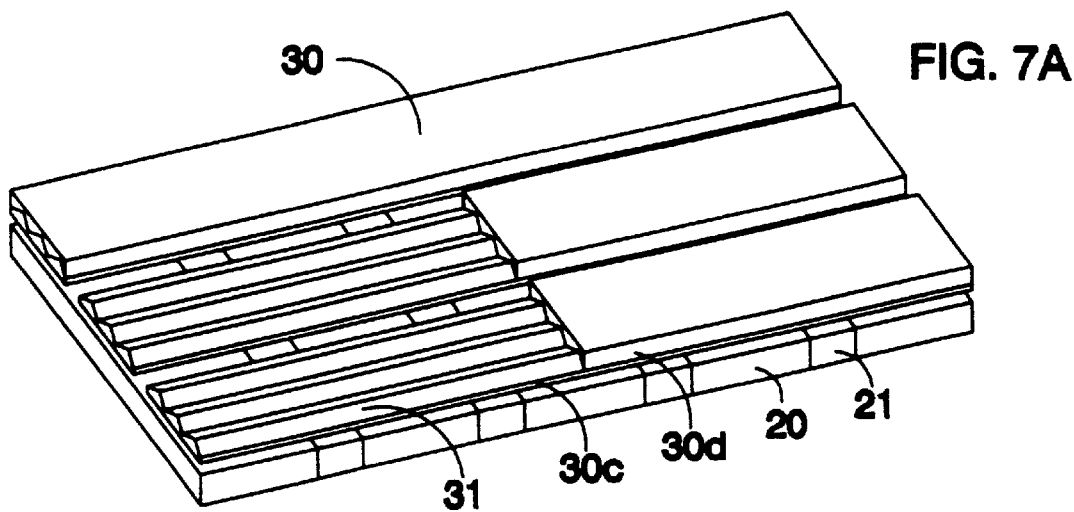
FIG. 7A shows an exploded perspective view of reflective light switches.
Figure 7B:
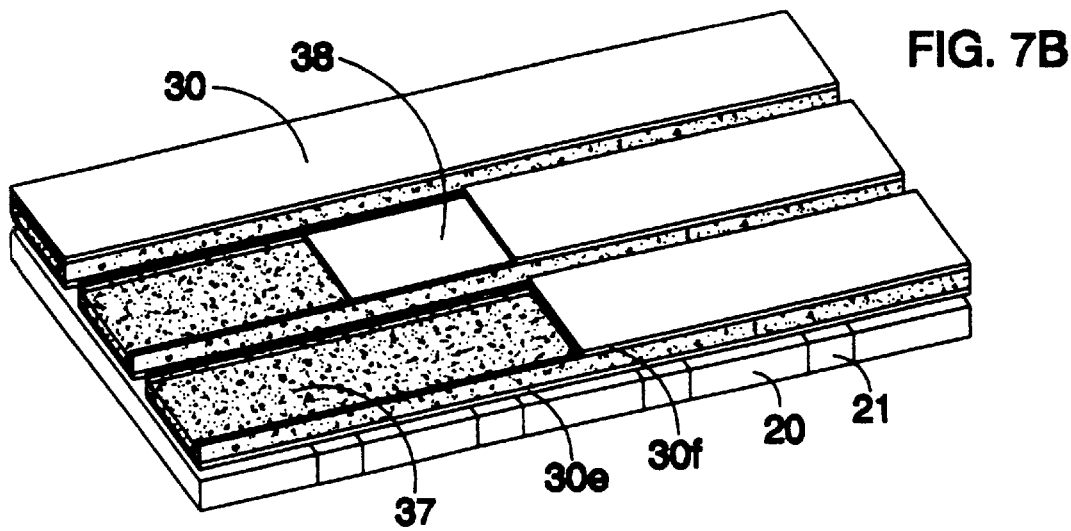
FIG. 7B shows an exploded perspective view of diffusive light switches.
Figure 7C:
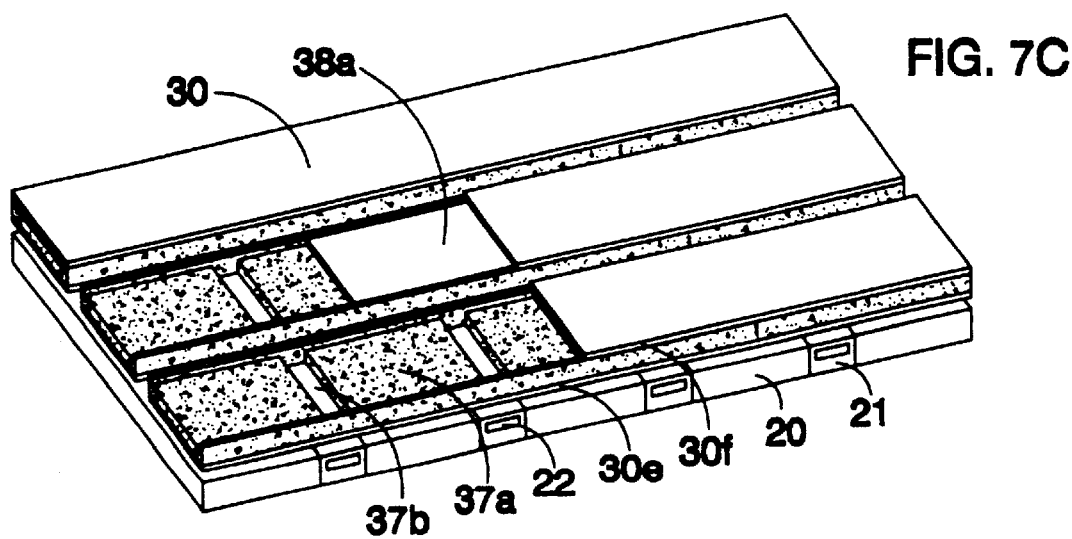
FIG. 7C shows an exploded perspective view of modified diffusive light switches with pixel dividers.

FIGS. 7A through 7C illustrate detailed structures of light switches 30. FIG. 7A shows an exploded perspective view of reflective light switches 30 that embrace the reflection mechanisms shown in FIG. 6A and FIG. 6B. Bulk portion of each light switch 30 is composed of two halves 30c and 30d. The lower half 30c should be made of a transparent material. The upper half 30d may be made of any insulating material while it is preferably the same material as that of the lower half 30c so that non-uniformity of thermal stress inside the light switch is minimized. A metal thin film reflector 31 is sandwiched between the lower and upper halves 30c, 30d of each light switch 30.

FIG. 7B shows an exploded perspective view of diffusive light switches 30 that embrace the light scattering mechanism shown in FIG. 6C. Each light switch 30 consists of four layers of materials, including front layer 30e, light diffuser 37, electrode 38, and back layer 30f. The functions and materials of these layers were previously described. FIG. 7C shows an exploded perspective view of modified diffusive light switches 30. Diffusers 37a are divided into individual pixels. The spaces 37b between adjacent diffuser 37a segments should be filled with a dark opaque material so that light does not diffuse across pixels. Thus, the modification improves display sharpness. The spaces 37b are aligned with waveguide claddings 21 below. When light-switch electrodes 38a are made of a metallic material, the spaces 37b may be filled with the electrode material. This would effectively decrease the distance between the light-switch electrodes 38a and the waveguide electrodes, especially when the waveguide electrodes 22 are embedded into waveguide claddings 21. Thus the modification decreases the driving voltage for the light switches 30.

Figure 8A:
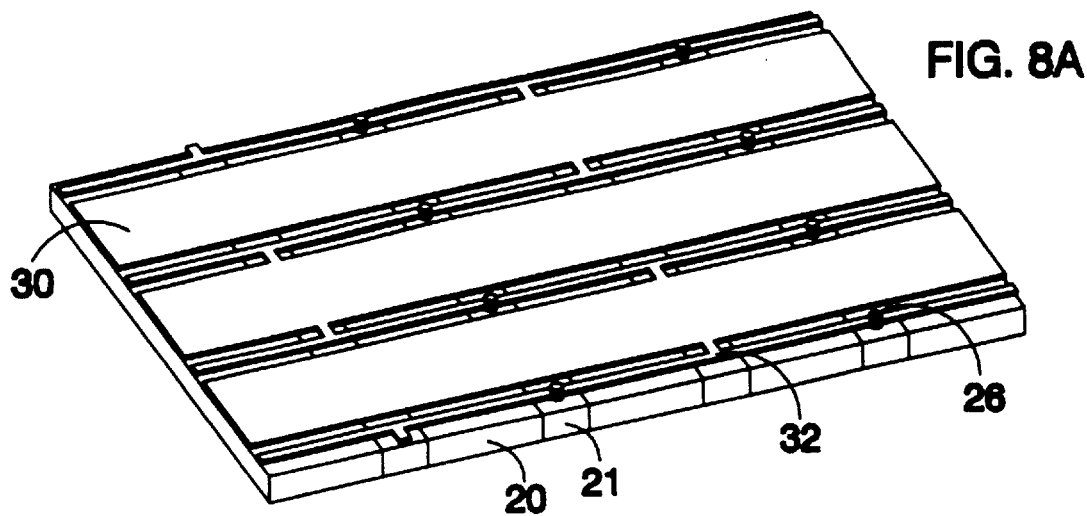
FIG. 8A shows a perspective view of light switches with side hinges.
Figure 8B:
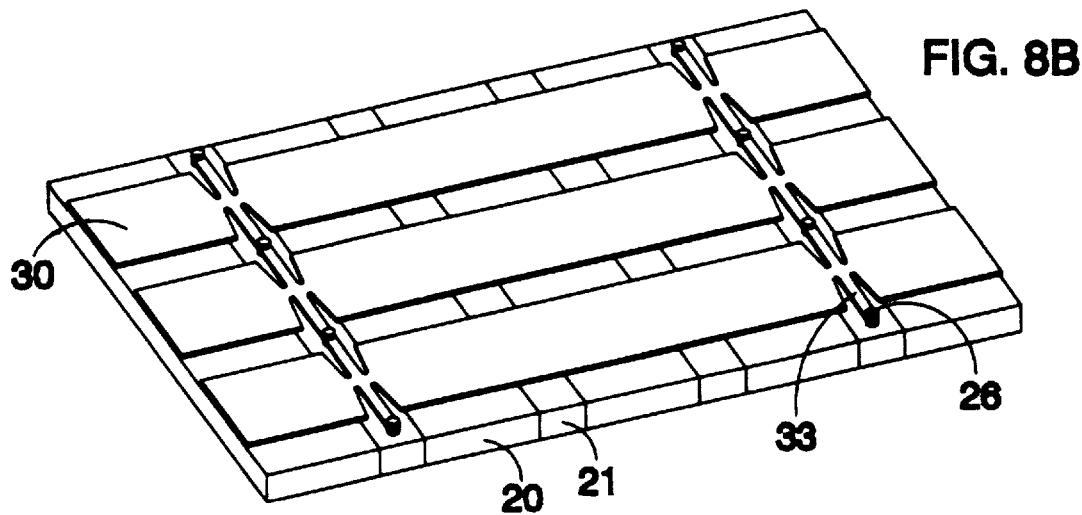
FIG. 8B shows a perspective view of light switches with cross hinges.
Figure 8C:
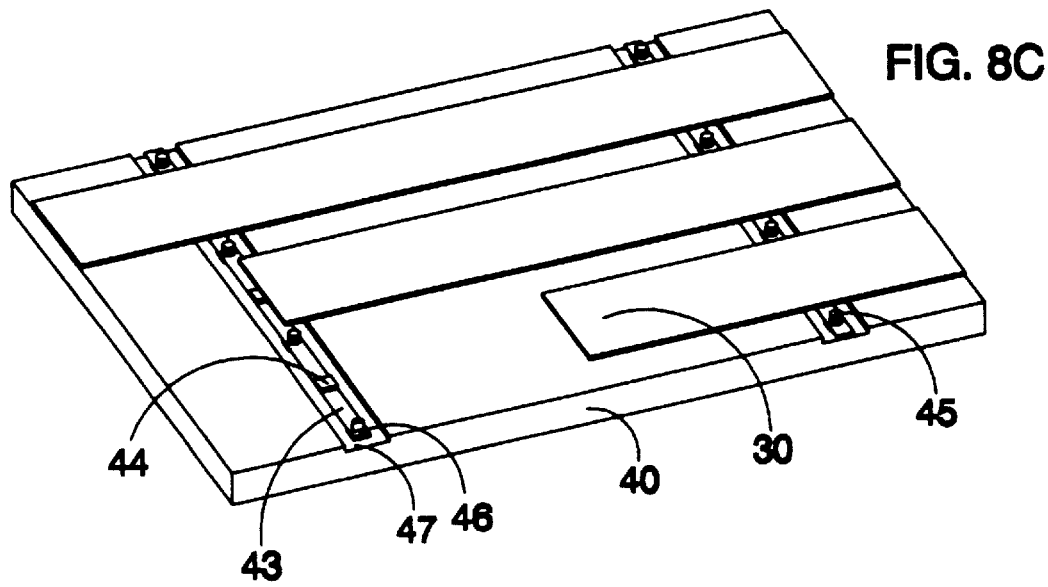
FIG. 8C shows a perspective view of light switches with back hinges that are affixed to a back-plate.

FIGS. 8A through 8C illustrate three mechanical supporting structures for the light switches 30. FIG. 8A shows the preferred embodiment. T-shaped hinges 32 are used to link the light switch 30 with anchors/spacers 26. This supporting mechanism prevents side-to-side movement of the light switch 30 and, therefore, provides mechanical stability to the light switch 30. The hinges 32 are preferably made of the same material as the bulk portion of the light switches 30. The length between two adjacent anchors/spacer 26, the width, and the thickness of the.hinges 32 determines the strength of the hinges 32. The hinges 32 should have a sufficient mechanical strength to maintain the light switches 30 in a suspended state under any predetermined gravitational force so as to provide a proper shock resistance. However, the strength should be limited to the lowest allowable level so that the light switches 30 can be actuated with a lowest possible voltage bias. Computer simulations may be used to estimate the proper values of the parameters (See for example, J. R. Gilbert, R. Legtenberg, and S. D. Senturia "3D coupled electro-mechanics for MEMS: applications of CoSolve-EM," Proceeding IEEE Micro Electro Mechanical Systems, (Cat. No. 95CH35754) pp. 122–127, 1995). Optimization of these parameters is well known to those of skilled in the art. Anchors/spacers 26 serve as anchors for affixing the light switches 30 as well as spacers for separating the optical waveguide plate 25 and the back plate 40 as illustrated in FIG. 2. These anchors/spacers 26 may be positioned in cladding 21 regions to minimize interference with propagation of light in the waveguide cores 20.

FIG. 8B shows another embodiment of mechanical supporting structures for light switches 30. Orthogonal hinges 33 are used. Design rules for these hinges 33 are as previously described.

FIG. 8C illustrates a supporting mechanism that links light switches 30 to a back plate 40. In this embodiment, hinges 43 are placed inside grooves 47 on the back plate 40. The hinges 43 are made of a metal, such as chromium, nickel, and aluminum, or any other suitable materials, such as Si, $SiO_2$, SiN, (where x=1–2), and a polymer. The light switches 30 are connected to the back plate 40 through spacers 44, the hinges 43, and anchors 46. Spacers 45 are used to separate the, back plate 40 from the optical waveguide plate 25 with the light switches 30 placed in between, as shown in FIG. 2. The spacers 44, 45, and anchors 46 are made of any solid and easy handling materials, such as metals, dielectrics, and polymers.

Light Coupling into Waveguides

Figure 9A:
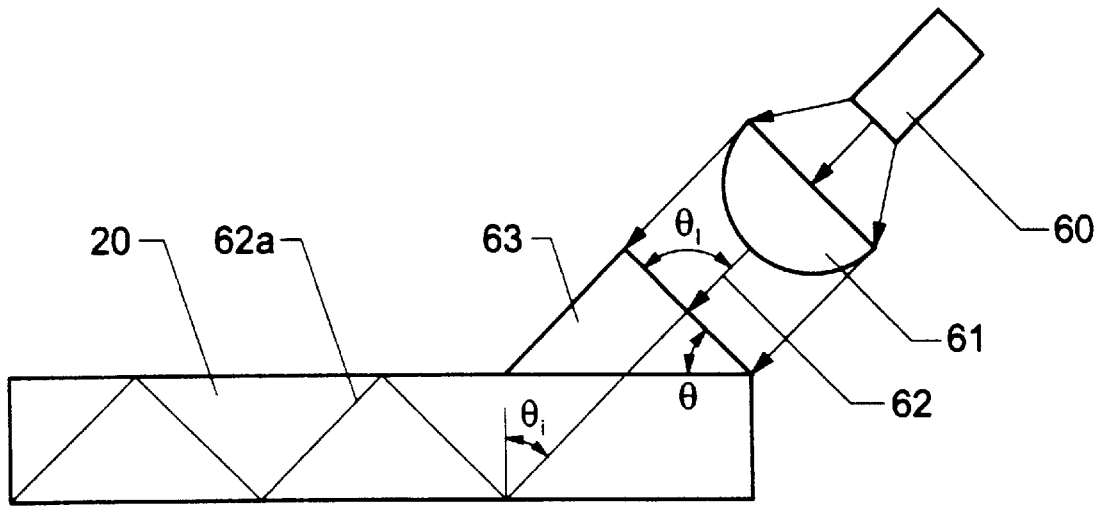
FIG. 9A shows a light coupling mechanism using an optical prism.
Figure 9B:
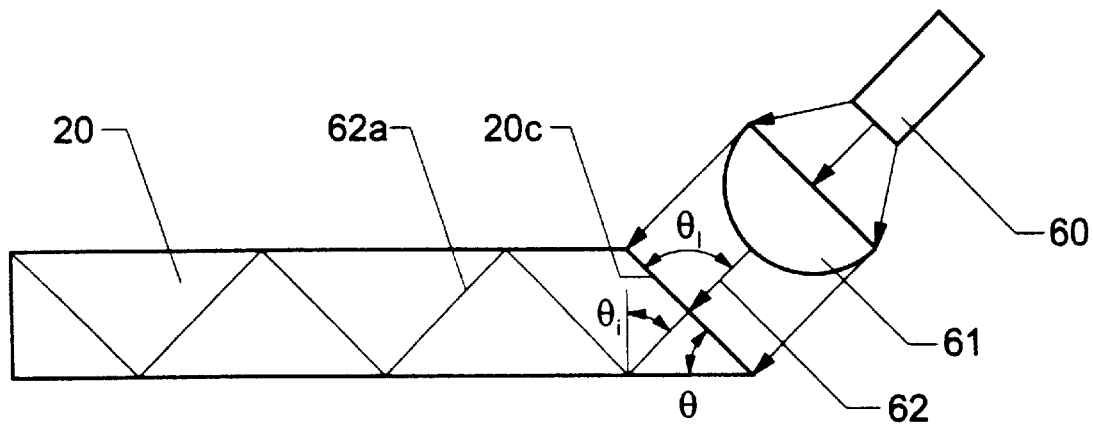
FIG. 9B shows a light coupling mechanism using a waveguide having a wedge-shaped end.

FIGS. 9A and 9B illustrate two preferred methods of coupling the light-source to the waveguides. A collimating lens 61 is used to convert divergent light from a light source 60 into a collimated light beam 62. The collimating lens 61 can be either a separate lens or an integrated portion of the light source. For example, a commercial light emitting diode (LED) often comes with a dome-shaped lens package. Such a packaged LED may be used directly without the addition of a separate lens. The lens 61 is not limited to geometrical lenses. For example, gradient index lenses may be used. In the preferred embodiment, shown in FIG. 9A, an optical prism 63 is used to couple the light beam 62 into a waveguide core 20. In principle, the incident angle $\theta_i$ of the propagating light beam 62a can be chosen anywhere between the critical angle of the waveguide core 20 and 90°. However, a preferred value for the incident angle $\theta_i$ is 45°. This incident angle $\theta_i$ is, according to Snell's law, determined by launching angle $\theta_l$ of the incident light beam 62, the prism angle θ, the refractive index of the prism 63, and the refractive index of the waveguide core 20. In a preferred mode, the launching angle $\theta_l$=90°, the refractive index of the optical prism 63 is the same as that of the waveguide core 20, and the prism angle θ=45°. The main advantage of this embodiment is the simplicity with which a display device can be assembled. The light source 60, collimating lens 61 and optical prism 63 can be integrated into a light-source module. During display device assembly, the light-source module can be simply attached to the surface of waveguides in a single step.

Another embodiment of light coupling arrangement is shown in FIG. 9B. A collimated light beam 62 is coupled to a waveguide core 20 through the wedge surface 20c. Preferred values of the angle parameters $\theta_j$, $\theta_i$, and $\theta$ are as previously described. This embodiment offers the advantage of coupling the light beam 62 directly into the waveguide core 20 without the use of an additional coupling prism. The coupling efficiency of this embodiment may be slightly higher due to the elimination of the interface between the optical prism 63 and waveguide core 20 (FIG. 9A). However, additional fabrication processes are involved in order to make the optically smooth wedge surface 20c.

Preferred Rules for Designing Optical Waveguides and Light Switches

Figure 10A:
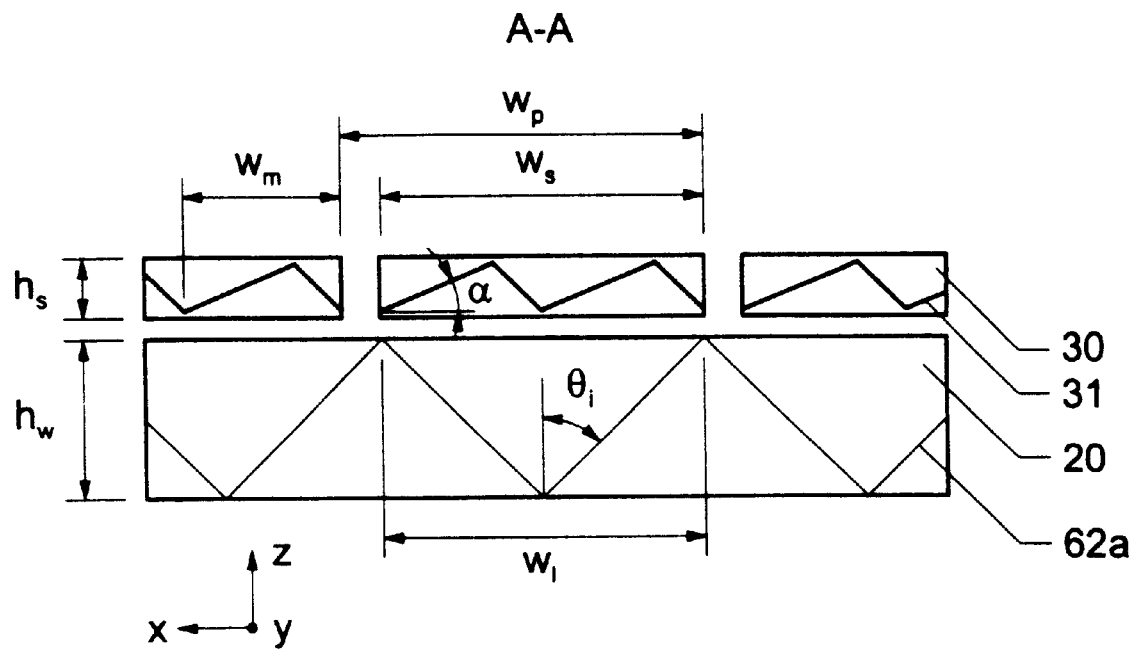
FIG. 10A is a z-x cross-section diagram of waveguide and light switches, showing detailed dimension of key components. The coordination of this diagram is consistent with that of FIG. 2. In the diagram, $\theta_i$ is the incident angle of a light beam, $\alpha$ is the tilting angle of a reflector, $h_w$ is the thickness of a waveguide, $h_s$ is the thickness of a light switch, $w_l$ is the zigzag period of a light beam, $w_p$ is the pitch of light switches, $w_s$ is the width of a light switch, and $w_m$ is the pitch of reflector segments.

Dimensions of the waveguides are determined by the optimization of device performance and required pixel sizes. FIG. 10A shows a schematic z-x cross-section view of the display device shown in FIG. 2. Detailed structures and dimensions of a waveguide core 20 and a light switch 30 are shown in this diagram. In order to obtain high optical throughput, multimode waveguides are preferred and, therefore, the thickness $h_w$ of the waveguide core 20 should be much larger than the wavelength of visible light. Inside the waveguide core 20, a light beam 62a propagates along a zigzag path. The period $w_l$ of the zigzag path, determined by incident angle $\theta_i$ and waveguide thickness $h_w$, is expressed as $$w_l = 2h_w \tan \theta_i \qquad \text{EQ. 1}$$

For an activated light switch 30 to completely extract the light beam 62a of all propagating modes from the waveguide core 20, the width $w_s$ of a light switch 30 should be larger than $w_l$. The pixel width of a display is determined by pitch, $w_p$, between adjacent light switches 30. Referring to FIG. 10A, in order to make a general-purpose display, the following relation should be observed:

$$w_p > w_s > w_l \qquad \text{EQ. 2}$$

A preferred incident angle $\theta_i$ is 45°. Deviation from this value, although still within the spirit of this invention, may lead to inferior optical performance of the display. According to the operation principles of waveguides, the incident angle $\theta_i$ must be larger than the critical angle of the waveguide core 20. Therefore, the construction of the waveguides should be done in such a way that the critical angles at the upper and the lower surface of the waveguide core 20 are smaller than 45°. In order to maximize the optical throughput of a waveguide, the thickness $h_w$ of the waveguide core 20 should be made as large as possible. However, $h_w$ should not exceed the upper limit set forth by EQ. 1 and EQ. 2.

Figure 10B:
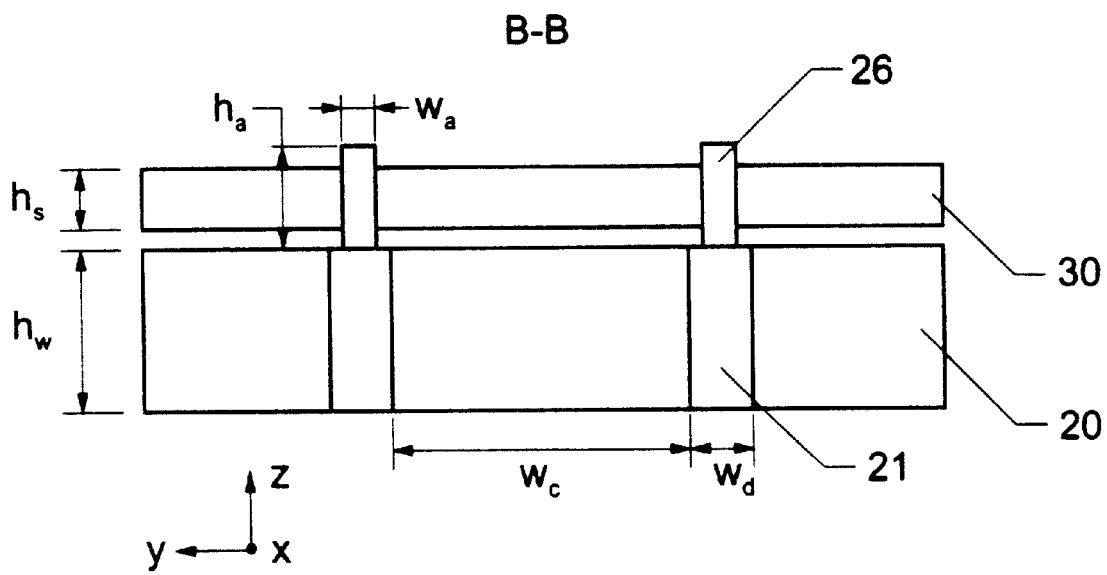
FIG. 10B is a y-z cross-section diagram of waveguide and light switches, showing detailed dimension of key components. The coordination of this diagram is consistent with that of FIG. 2. In the diagram, $h_a$ is the height of an anchor/spacer, $w_a$ is the diameter of an anchor/spacer, $w_c$ is the width of waveguide core, and $w_d$ is the width of a waveguide cladding.

FIG. 10B illustrates a schematic y-z cross-section view of the display device shown in FIG. 2. In order to maximize the optical throughput of waveguides, the width $w_c$ of a waveguide core 20 should be made as large as possible. However, $w_c$ is limited by the size of display pixels. The length of a pixel is defined by the pitch between adjacent channels, which is the summation of the width $w_c$ of a waveguide core 20 and the width $w_d$ of a waveguide cladding 21. The width $w_d$ should be as narrow as possible so long as sufficient optical confinement is achieved and a sufficient area is reserved for the placement of anchors/spacers 26. The anchors/spacers 26 are preferably located on top of the claddings 21 and are confined within the cladding 21 area so that light wave propagation within the waveguide cores 20 is not be disturbed. For example, if the anchors/spacers 26 are cylindrical in shape, the diameter $w_a$ of the anchors/spacers 26 should be smaller than the width $w_d$ of the cladding 21. The height $h_a$ of the anchors/spacers 26 determines a free space in which the light switches 30 are contained. The difference between the height $h_a$ of the anchors/spacers 26 and the thickness $h_s$ of the light switches 30 defines the maximum gap between the light switches 30 and the waveguide cores 20. The gap should be made large enough so that when a light switch 30 is off light wave propagation inside the waveguide cores 20 is not disturbed. The gap should, however, be made as small as possible so that the voltage bias for the actuation of the light switches 30 is minimized. The proper value of the maximum gap can be determined from a plot of optical tunneling versus the gap, such as the one shown in FIG. 4B.

Referring to FIGS. 10A and 6A, flat reflectors 31 in light switches 30 are tilted at an angle $\alpha$ so that a light beam 62a can be reflected out of the display panel. A preferred tilting-angle $\alpha$ of the reflector 31 produces a reflected light beam 62b perpendicular to the surface of a waveguide core 20 so as to maximize light extraction. The proper tilting-angle $\alpha$ can be easily calculated using Snell's law from the incident angle $\theta_i$, the refractive indices of the waveguide cores 20, and the light switches 30. For example, assuming that the light switches 30 and the waveguide cores 20 have the same refractive index and that the incident angle $\theta_i$ is 45°, the preferred tilting angle $\alpha$ is, then, 22.5°. As previously described, the reflectors 31 in the light switches 30 are segmented in order to reduce the light switch thickness $h_s$. In case of using electrostatic actuation, thinner light switches 30 are preferred for the purpose of reducing the actuation voltage. Once the tilting angle $\alpha$ is fixed, the thickness $h_s$ of a light switch depends on the width $w_m$ of the reflector segment. Thus, the width of reflector segment, $w_m$, should be small. On the other hand, $w_m$ should be large enough to avoid light diffraction from the segmented mirrors. Generally, $w_m$ from 10 to 40 $\mu$m is considered to be appropriate. As long as $w_m$ is kept constant, the thickness of the light switches is independent of the width of the light switches. In other words, the thickness of the light switches is independent of the size of pixels and display screens.

Assuming a 150 mm×200 mm display of a 480×640 resolution with square pixels, the pitch between adjacent light switches 30 would be $w_p$=312.5 $\mu$m. leaving some space for anchors/spacers between the adjacent light switches 30, the width of the light switch 30 should be approximately $w_s$=270 $\mu$m. Assuming an incident angle $\theta_i$=45°, from EQ. 1 and EQ. 2 the thickness $h_w$ of the waveguide should be less than 135 $\mu$m. Suitable thickness is $h_w$=110 $\mu$m. The width $w_c$ of the waveguide cores 20 should be much wider than the width $w_d$ of claddings 21 under the restriction $w_c + w_d = w_p$. Suitable dimensions are $w_c$=270 $\mu$m and $w_d$=42.5 $\mu$m.

Materials for the construction of waveguides and light switches should be selected based on the consideration of optical, mechanical and thermal properties of the materials. The material compatibility with the intended fabrication processes must also be considered. Low optical attenuation in the visible range is of primary importance for waveguide core materials while it is of somewhat less critical for cladding materials. The difference between the refractive indices of the core and cladding materials should be made as large as possible to achieve maximum optical confinement and/or numerical aperture of resulting waveguides. In general, an increase in the numerical aperture leads to an increase of light coupling efficient from a light source into the waveguide. The refractive index of the transparent portion of a light switch is preferably the same as that of waveguide cores. This helps to minimize the Fresnel reflection loss at the interface of the light switches and the waveguide cores.

Relevant mechanical properties of the light switch materials include the elastic properties, tribological properties, and fatigue properties. Light switches should be designed in such a way that the stress in any part of the light switch during operation remains in elastic region of the applied materials. The light switch and waveguide materials should be wear and fatigue resistant so as to increase device lifetime.

Thermal expansion properties of all connecting components, including front plate, waveguides, light switches, and back plate, of a display system need to be carefully matched or considerations must be given to implement certain types of stress release mechanisms in the system.

Front and Back Plates

Figure 11A:
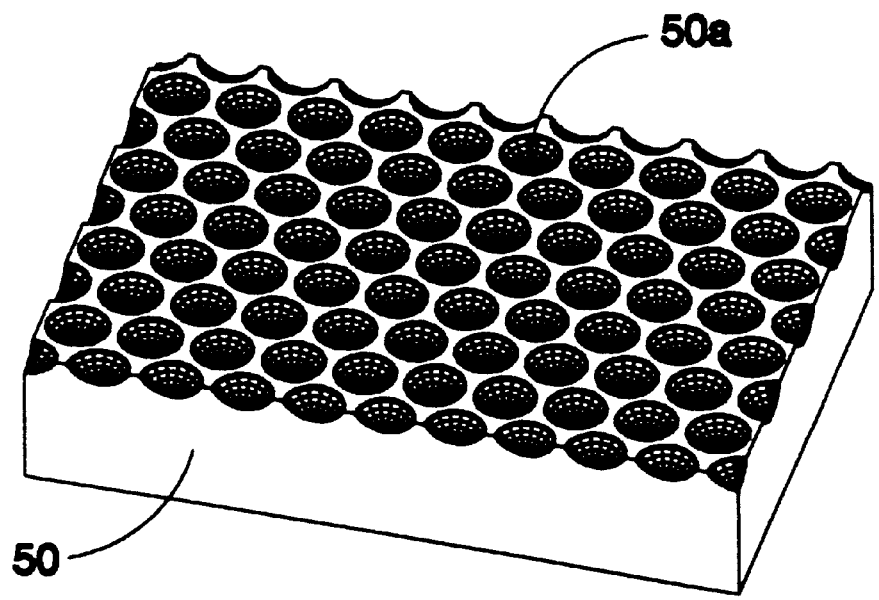
FIG. 11A illustrates a perspective view of a front glass with indentation light disperser.
Figure 11B:
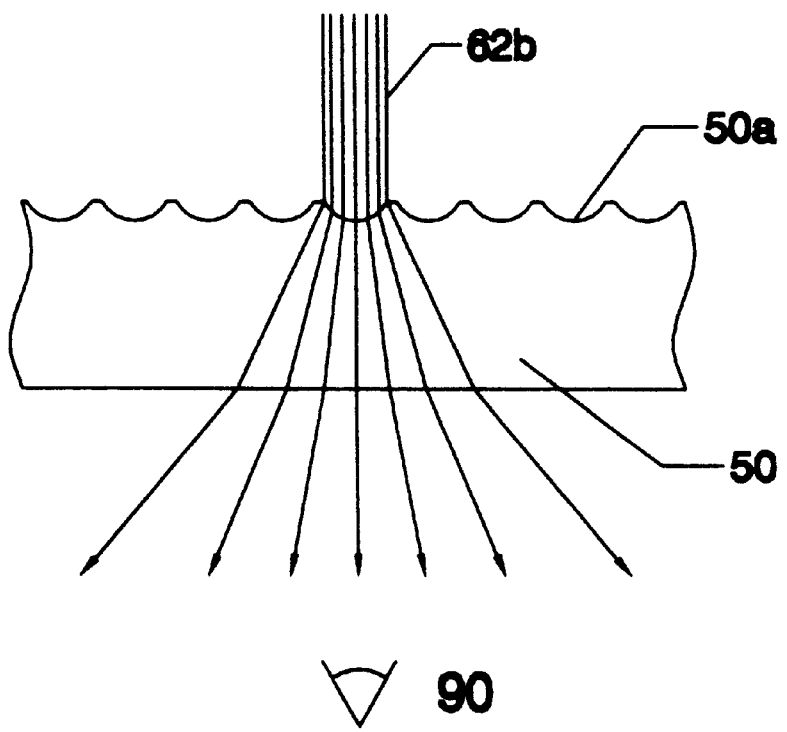
FIG. 11B is a cross-section view of the front glass, shown in FIG. 11A, illustrating the trajectory of a diverging light beam.

The front plate 50 (FIG. 2) serves as a protective shield for the display panel. The plate may be made of a transparent glass, plastic, or any other available and suitable materials. Other performance enhancement functions, such as viewing angle expansion and antireflection, may be incorporated into the front plate 50. The viewing angle expansion function of the front plate may be accomplished by using a light disperser. The light disperser may either be a frosted surface or a carefully designed and patterned surface. FIG. 11A shows an embodiment of a patterned light disperser on the front plate 50. Concave indentations 50a are used in this embodiment. FIG. 11B shows a cross-sectional view of FIG. 11A and illustrates the divergence of a light beam through a concave indentation 50a. The concave indentations 50a may be made in a simple spherical shape and may be orderly or randomly arranged. In case of the ordered arrangement, the period of the indentations 50a ought to be significantly larger than the wavelength of visible light so as to avoid diffraction. On the other hand, this period ought to be small enough so that each pixel area accommodates several indentations 50a and uniform light dispersion is obtained in all directions. The indentations 50a on the front plate 50 may be formed by etching, embossing, or any other available and suitable methods that are known in the art.

Figure 12:
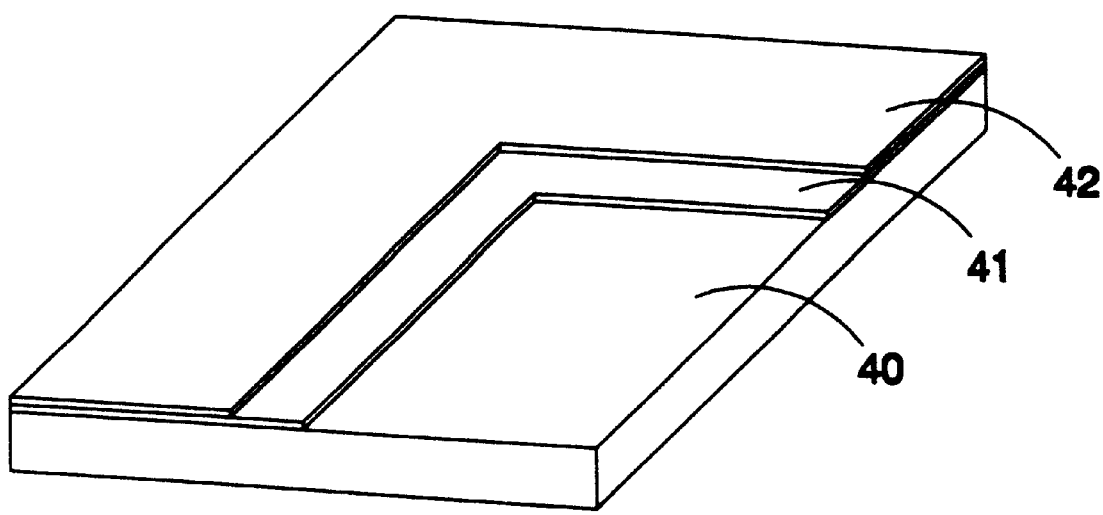
FIG. 12 shows an explored perspective view of a back plate with a planar electrode.

A back plate 40 (FIG. 2 and FIG. 3) serves as an enclosure as well as a stationary electrode for the electrostatic actuation of the light switches 30. Similar to the electrode on the waveguide surface, a conductive film 41 and an insulating film 42 are deposited on the back plate 40 as shown in FIG. 12. The conductive film 41 is preferably made of highly conductive metals, such as aluminum and gold. However, many other conductive materials may also be used for cost and specific application purposes. The insulating film 42 can be made of silicon dioxide or any other available and suitable insulating materials, such as silicon nitride and polymers. The films may be deposited by a wide selection of processes, such as vapor deposition, sputtering, and spin coating depending on the type of materials, the facility availability, and the cost considerations.

Light Sources

Light sources are preferably made of light emitting diodes (LEDs). Commercially available LEDs have high-energy efficiency, adequate light intensity, compactness, reasonable price, and mature waveguide coupling technologies. However, other light sources, such as lasers, liquid crystal modulated light source, and micromirror array light source may also be used.

Figure 13A:
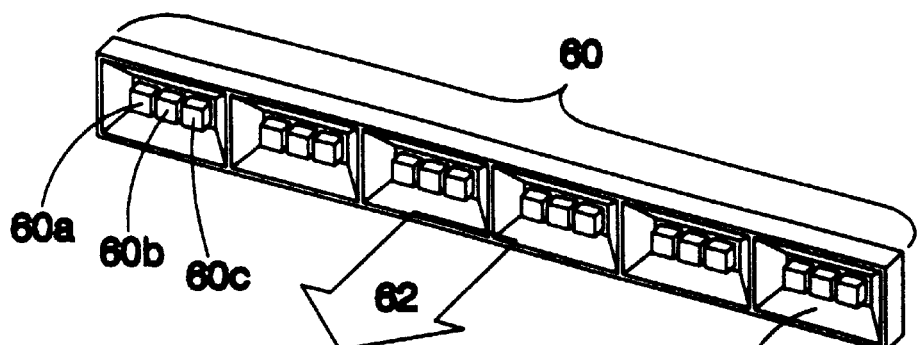
FIG. 13A illustrates a surface-emitting red-green-blue LED array.

FIG. 13A illustrates an exemplary LED light source 60 that is composed of a linear array of full color LED elements. Each element consists of three sub-elements, consisting of red 60a, green 60b, and blue 60c colors, of surface emitting LEDs. A reflector 63 is placed behind the LEDs so as to reflect light from the back and sides of LED emitters and therefore to increase external efficiency and brightness of the LED element. While not shown in the figure, a collimating lens is preferably integrated with the LED light source 60. The collimating lens may include a linear array of dome lenses, a linear array of gradient index lenses, or simply a cylindrical lens.

Figure 13B:
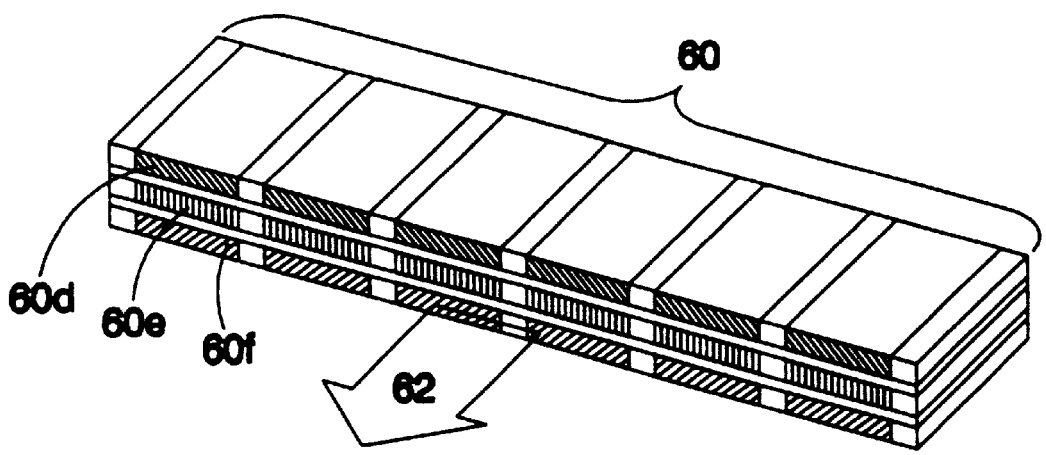
FIG. 13B illustrates a stacked edge-emitting red-green-blue LED array.

FIG. 13B illustrates another example on LED array light source 60, utilizing edge-emitting LEDs. As a full color light source, three one-dimensional arrays of red 60d, green 60e, and blue 60f LEDs are stacked one on top of another. In both embodiments, shown in FIG. 13A and 13B, the pitch between adjacent LED elements is preferably the same as that between adjacent waveguide cores 20 (FIG. 2). When a display is assembled, each LED element, consisting of red-green-blue sub-elements, are aligned with a corresponding waveguide core 20. Thus, each waveguide core 20 carries light beams 62 of all three primary colors.

Figure 13C:
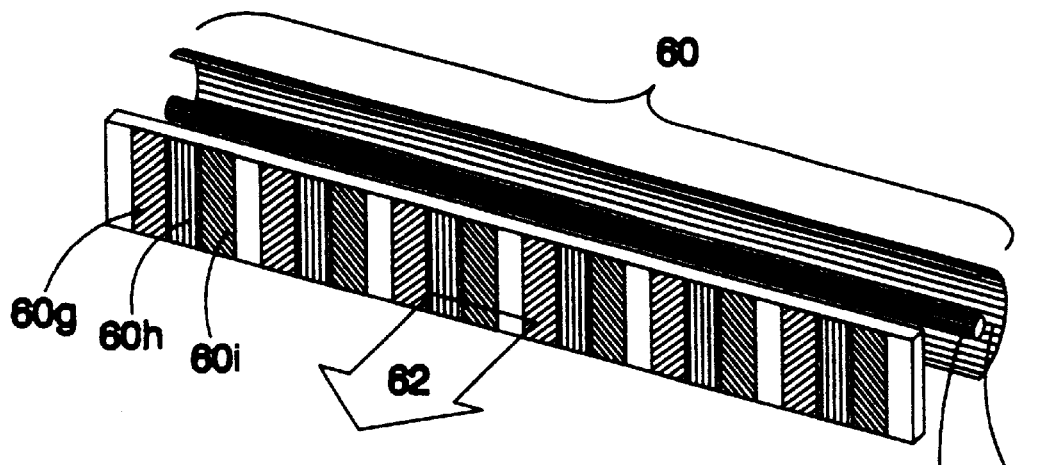
FIG. 13C illustrates a liquid crystal modulated light source.

FIG. 13C schematically illustrates an exemplary liquid crystal modulated array light source 60 that may also be used in the waveguide display of this invention. This light source 60 consists of a light tube 64, a light reflector 65, and liquid crystal light modulators 60g, 60h, 60i with red, green and blue color filters, respectively. The liquid crystal light modulators can be fabricated by using a well established liquid crystal display technology, that has been described by O'Mara in "Liquid Crystal Flat Panel Displays—Manufacturing Science and Technology", Van Nostrand Reinhold, New York (1993).

Power Supply and Driving Circuit

The disclosed display device is preferably operated in a line-scan mode with light-switches engaging sequentially one at a time and a parallel driven array light source refreshing synchronically. The light switches can be actuated with a driving circuit that is similar to the ones used for gate scan of AMLCD, which have been described by O'Mara in "Liquid Crystal Flat Panel Displays—Manufacturing Science and Technology", Van Nostrand Reinhold, New York (1993). When using an LED array light source, the light intensity of the LED array is preferably controlled by a parallel driven current or pulse modulation circuit. For a full color LED array light source, separate driving circuits may be required for RGB sub-elements. The RGB sub-elements can be either modulated simultaneously or sequentially.

Interactive Display

Figure 14:
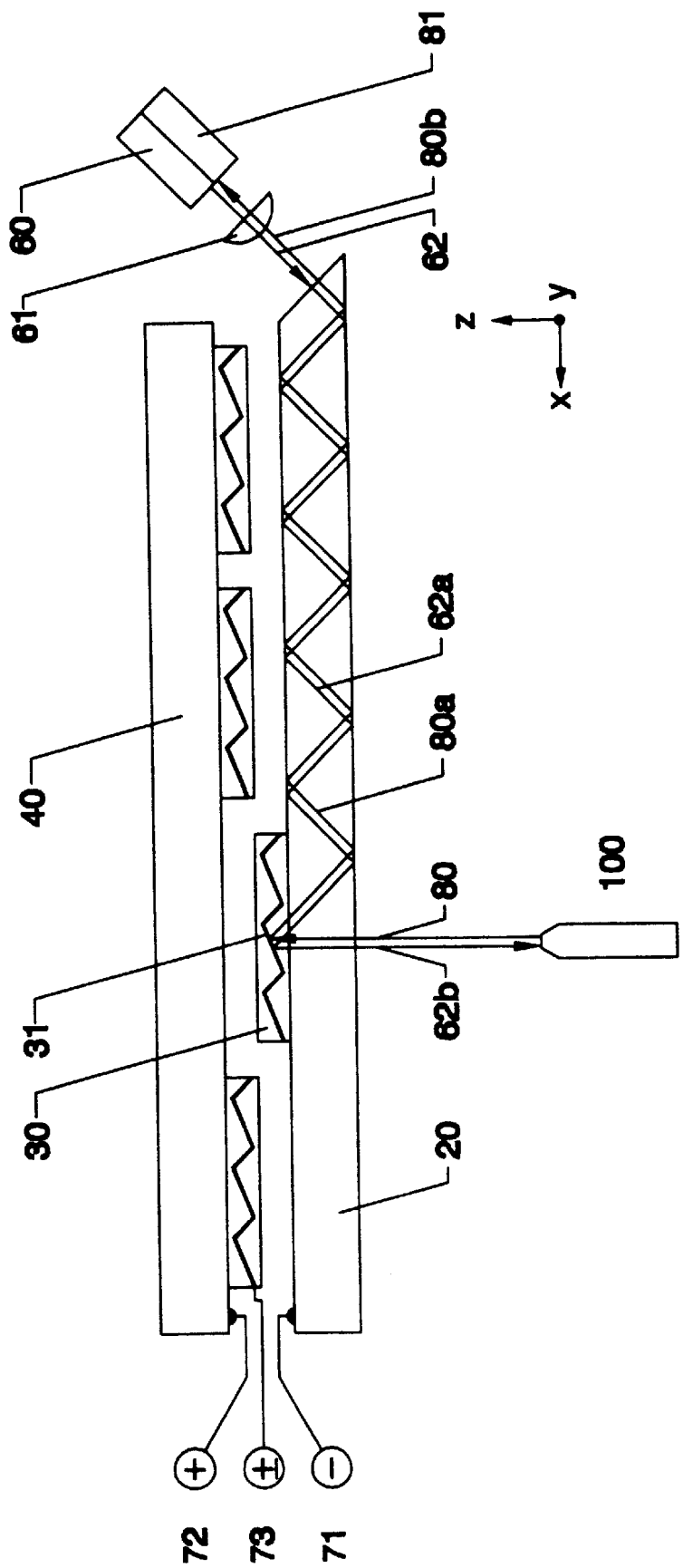
FIG. 14 illustrates an interactive display involving the use of a light pen.

Interactive functions can be readily implemented into the disclosed optical device. As shown in FIG. 14, the addition of an array photodetector 81 adjacent to an array light source 60 permits the display device to detect input optical signals. The input optical signals can be used for interactive purposes. For example, as shown in FIG. 14, a light pen 100, pointed towards a display screen, emits a light beam 80, which impinges on a light switch 30, and is then reflected by a mirror reflector 31. Light switches 30 are operated in a normal line scan mode, i.e. they are activated sequentially. When the light beam 80 impinges on an activated light switch 30, the reflected light beam 80a is coupled into a waveguide core 20, propagates along the waveguide core 20, and is detected by a corresponding element of the array photodetector 81. However, if the light beam 80 impinges on an inactivated light switch 30, the reflected light beam would either be trapped inside the light switch 30 or be reflected back into free space (not shown in FIG. 14) and will not be coupled into the waveguide core 20. The position of the impinging light beam 80 on the display screen can be identified from the signal received by the array photodetector 81. A responding action can be executed accordingly by, for example, a computer. The wavelength of the light beam 80 may vary from infrared to UV, so long as all the concerning optical components, including front glass, waveguide, light switches, and photodetectors of the display are compatible with the wavelength. A wavelength filter may be placed in front of the photodetector 81 (not shown in FIG. 14) to allow only the optical signal from the light pen 100 to pass so that reliability of signal readout is enhanced. A pointer does not have to be an emissive light pen. For example, the light pen 100 may be a reflective light pen. In this case, the light beam 80 is produced by the reflection of light 62b coming out a display screen.

Figure 15:
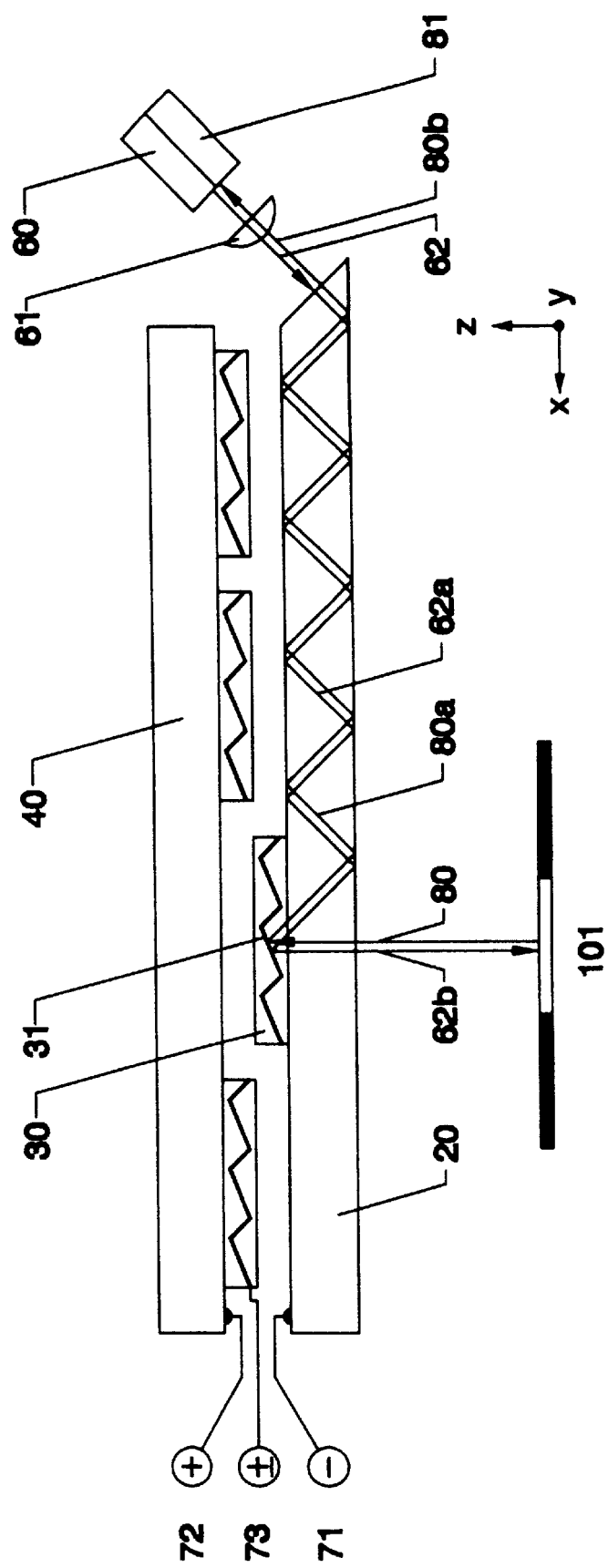
FIG. 15 illustrates a display-scanner.

The present invention may also be used as an optical scanning instrument. In this example (FIG. 15), the input optical signal is a light beam 80 reflected from a paper 101, which is held up to the display screen. The paper 101 may be illuminated by the display itself. If the light source 60 is composed of three RGB primary colors, full color scans can be obtained by turning on RGB light sub-elements sequentially. Preferably, the intensities of all the light sub-elements of each color in the array light source 60 are set the same and held constant when scanning data are collected. The image on the paper 101 can be synthesized from the data collected by the array photodetector 81.

A device such as the present invention, which provides a dual function of information display and information input, may find a wide range of applications. For example, an interactive panel display using a light pen may replace a CRT-keyboard-mouse system as an intuitive, convenient, and compact interface between computers and human users. A display-scanner may be used conveniently to convert printed documents, either text or image, into digital forms for processing, storage, or transmission. Obviously, the disclosed interactive displays may be widely used in office, in home, or in outdoor fields.

Fabrication of Waveguide

Figure 16A:
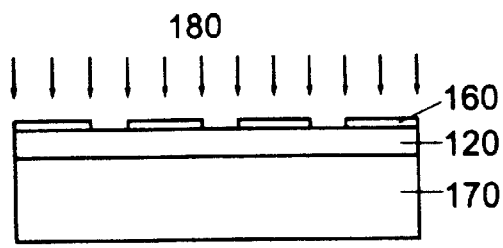
FIGS. 16A through 16F illustrate a step-by-step fabrication process of making a waveguide assembly.
Figure 16B:
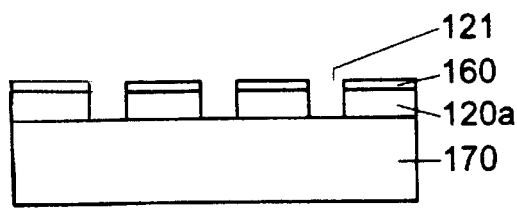
Figure 16C:
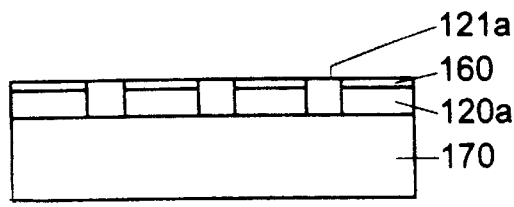
Figure 16D:
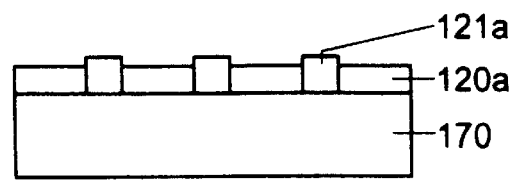
Figure 16E:
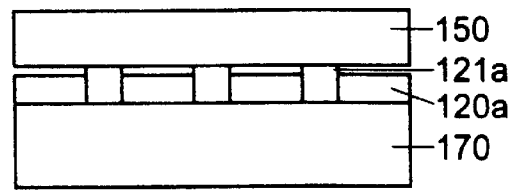
Figure 16F:
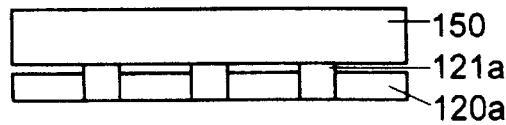

The exemplary waveguides shown in FIG. 5 may be fabricated by micromachining, ion exchange, or co-extrusion methods. Fabrication is not however limited to these three methods. In micromachining process, a flat glass sheet is used as the starting material. Cladding regions of the waveguides are lithographically defined, removed by using dry or wet etching methods, and then filled up by using a transparent material, such as polymer, aerogel, or glass paste of lower refractive indices than that of the core glass. FIGS. 16A through 16F schematically illustrate a step-by-step procedure of the fabrication process. In the first step, shown in FIG. 16A, a glass sheet 120 is bonded to a wax block 170 on one side land coated with a mask 160 on the other side with open areas defining waveguide claddings. A wet or a dry chemical steam 180 is used to pattern the glass sheet 120. A wet or a dry sand blasting may also be used. FIG. 16B shows the result of the patterning process. Trenches 121 are created and waveguide cores 120a are formed. It is important to ensure that the waveguide cores 120a have straight and smooth sidewalls so that the scattering attenuation of resulting waveguides is minimized. The trenches are filled with low-refractive-index polymer material and waveguide claddings 121a are formed (FIG. 16C). In the next step, FIG. 16D, the mask 160 is removed and extruded portions of the claddings 121a are exposed. A front glass-plate 150 is then bonded to the extruded portions of the claddings 121a as shown in FIG. 16E. Finally, the wax block 170 is removed and the product is shown in FIG. 16F. This method permits the use of glass and polymer materials of a wide range of optical properties. For example, optical glass materials with a refractive index higher than 1.8 are available and optical grade fluorinated polymers with a refractive index as low as 1.29 can be obtained commercially. As previously described, the large difference in the refractive indices leads to a large numerical aperture of the waveguides and, consequently, light can be coupled efficiently from light source into waveguides. Another advantage of this procedure is that the resulting waveguides are attached to the front glass plate 150, which enhances the mechanical strength of the waveguides and, therefore, makes them easier to handle in successive fabrication processes.

The second exemplary waveguide fabrication process involves the use of a well documented ion exchange method as described by Albert, in "Introduction to Glass Integrated Optics", Chapter 2, ed. by S. Iraj Najafi, Artech House, Boston (1992). In this process, a sodium-containing glass sheet is used as the starting material. The waveguide cores are lithographically defined. Silver, thallium, cesium, or other elements may be used to replace sodium ions in the glass so as to achieve a higher refractive index.

The third exemplary waveguide fabrication process involves co-extrusion of plastic and/or glass materials of two different refractive indices. The process is similar to optical fiber production process. The extrusion process may be used in a large-scale production to produce low cost waveguides.

Fabrication of Light Switches

Light switches may be fabricated by using micromachining technologies, well known in the production of semiconductor chips. The light switches may be made of a wide-range of materials that meet previously defined criteria. Materials may be chosen from a wide range of organic polymers, inorganic materials, and inorganic-organic hybrid materials. The organic polymers may include, but are not limited to, polyimides, polyacrylates, and other polymers. The inorganic materials may include various silicate based and lead containing glass materials. The inorganic-organic materials may include various organic modified ceramic materials, which have been extensively described in literature. (Klein of "Sol-gel Optics Processing and Applications", Kluwer Academic Publishers, Boston, 1994). Exemplary fabrication procedures are illustrated in the following.

Figure 17C:
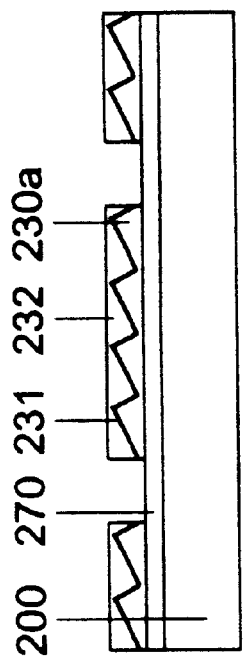
FIGS. 17A through 17D illustrate a step-by-step fabrication process of making light switches having segmented reflectors.
Figure 17D:
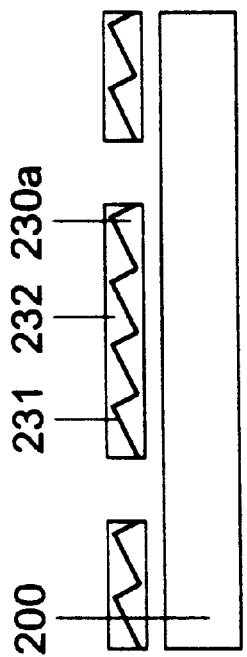
Figure 17A:
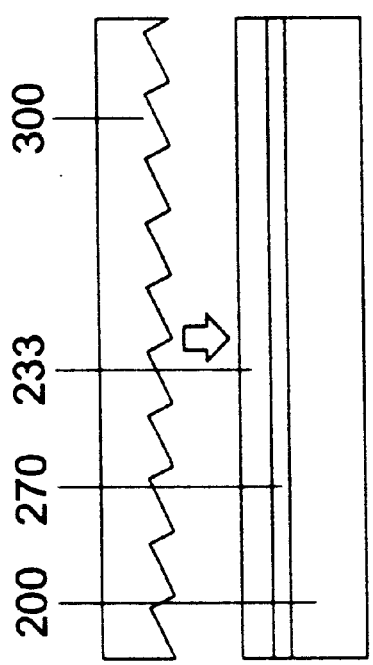
Figure 17B:
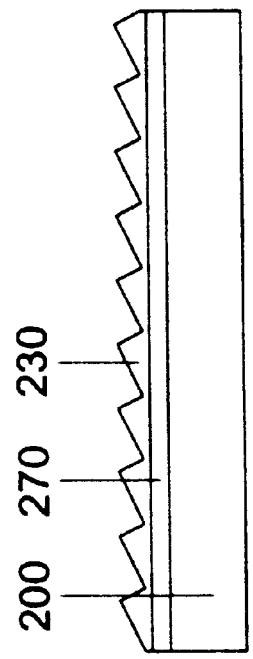

The first exemplary procedure, shown schematically in FIGS. 17A through 17D, can be used to fabricate light switches that contain segmented mirror reflectors. FIG. 17A illustrates an embossing process that forms reflector profiles. A sacrificial layer 270 and a plastic layer 233 are deposited on a substrate 200. The substrate 200 can either be a optical waveguide plate or a back plate. The sacrificial layer 270 is made of a metal, a polymer, or a dielectric material that is to be removed in a later step so that a gap between a light switch and the substrate 200 can be created. The plastic layer 233 is made of any one of the suitable transparent materials, which include polymer resins, glass frits, or sol-gel materials. The plastic layer 233 is embossed by using a stamper 300. FIG. 17B shows that the first half 230 of a light switch is formed as the result of the embossing process. A metal film is then deposited on the surface of the first half 230 of the light switch, by vapor deposition, plating or any other suitable means, to form mirror reflectors 231. The surface of the reflector 231 is then covered with a suitable material that would preferably fill up the groovy reflector surface and form the second half 232 of the light switch. The second half 232 of the light switch is preferably made of the same material as that of the first half 230 of the light switch. A lithographic patterning process is then applied to form a desired light switch pattern, as shown in FIG. 17C. The lithography may be a photolithography, screening printing, or any other suitable means, depending on the critical dimensions of the light switches and cost considerations. The patterning process may be dry etching, wet etching, or any other suitable means. In the final step of the light switch fabrication the sacrificial layer 270 is removed and the light switches are suspended as shown in FIG. 17D. The removal of the sacrificial layer 270 can be a dry or a wet etching process, depending on the chemical properties of the sacrificial layer 270 and the light switch materials.

Figure 18A:
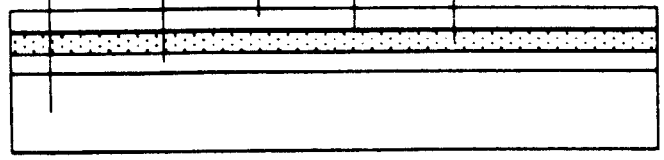
FIGS. 18A through 18C illustrate a step-by-step fabrication process of making diffusive light switches.
Figure 18B:
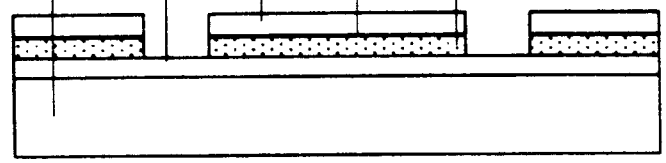
Figure 18C:
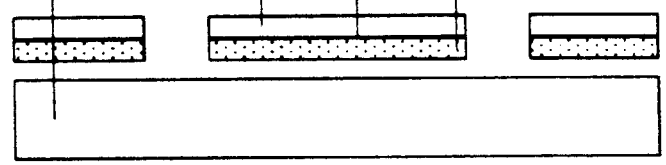

A second exemplary procedure is demonstrated in FIGS. 18A through 18C. Diffusive light switches may be fabricated by using this process. A sacrificial layer 271, a light-diffuser layer 237, a metal reflector/conductor layer 238, and a capping layer 239 are deposited, in sequence, on a substrate 200 (FIG. 18A). The sacrificial layer 271 can be made of a metal, a polymer, or a dielectric material that is to be removed in a later step with an appropriate etching process. The light diffuser layer 237 can be made from a wide selection of materials that have non-uniform structures. For example, the material can be a mixture of a pigment and a transparent host material, such as $TiO_2$ pigment in a polymer host. The metal reflector/conductor is preferably made of a highly reflective and conductive metal, such as, aluminum or silver. However, the process compatibility of the metal with the light diffuser layer 237 and the capping layer 239 must also be considered. The capping layer 239 is preferably made of an electrically insulating material. Lithographic and etching processes are applied to form desired patterns of the light switches, as shown in FIG. 18B. The sacrificial layer 271 is then removed by using a wet or a dry etching process depending on the chemical properties of the sacrificial and light-switch materials. The resulted structure is shown in FIG. 18C.

Figure 19:
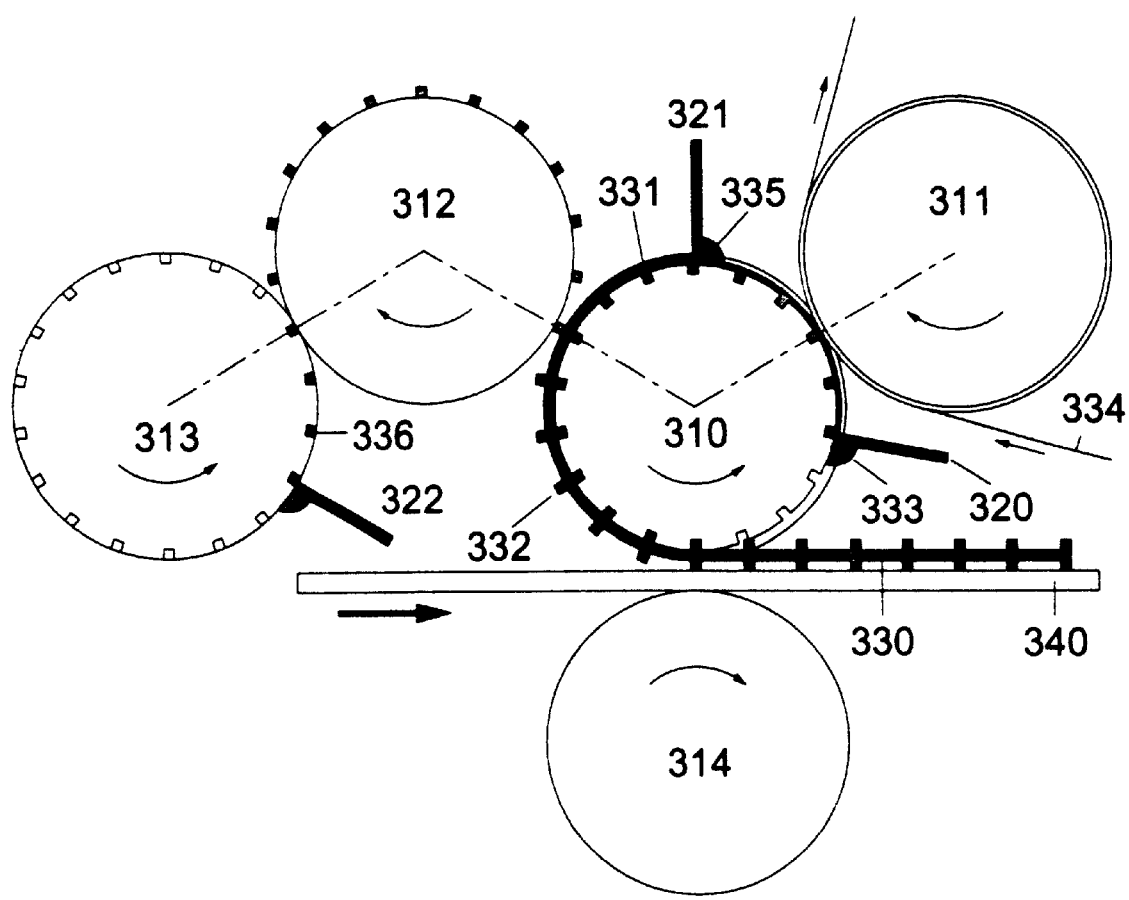
FIG. 19 illustrates a rotogravure process for fabrication of light switches.

Molding processes may be used to fabricate light switches for the commercial production of disclosed display devices. FIG. 19 shows an exemplary process involving a rotogravure-printing technique. Two gravure rollers 310, 313 and one stamp roller 311 perform the function of shaping the structures of light switches. Gravure roller 310 contains host molds, which shape and retain molded structure until the structure is completed and is transferred to a substrate 340. The process starts with filling up cavities of the gravure roller 310 with a polymer precursor 333 to a desired level by a doctor blade 320. Then a stamp roller 311, which has a wavy surface profile, embosses the polymer (at an elevated temperature if necessary) to form segmented mirror facets. At the same time, a metal film 331 is transferred from a carrier foil 334 onto the polymer surface to form mirrors. The cavities are then completely filled up by another layer of polymer 335 using a doctor blade 321. Spacer dots 336 are formed on the gravure roller 313 and are then transferred by an offset roller 312. These dots 336 can be made of adhesive materials or another adhesive roller will be added to apply a thin adhesive film onto the top of the spacers 332. The molded structure then comes into contact with the flat substrate 340, under a contact pressure controlled by an impression roller 314, becomes bonded, and, therefore, is transferred to the substrate 340. The substrate is preferably the back-plate of a display assembly (FIG. 12). This plate contains only a uniformly coated conductive film with an insulating film on top, therefore no precision alignment is required. The procedure shown in FIG. 19 is only one exemplary illustration among many variations of molding processes. For example, molds on flat plates can be used. In this case, the molding process would be similar to the ones used for making optical compact disks.

Packaging

Hermetic sealing is preferred for device packaging. Moisture should be removed from the package in order to avoid any light-switch stiction problems during device operation. For those devices that require high-speed light switches, pressure inside the package is preferably below $10^{-3}$ bar so as to minimize damping effect.

Variations and Modifications

Figure 20:
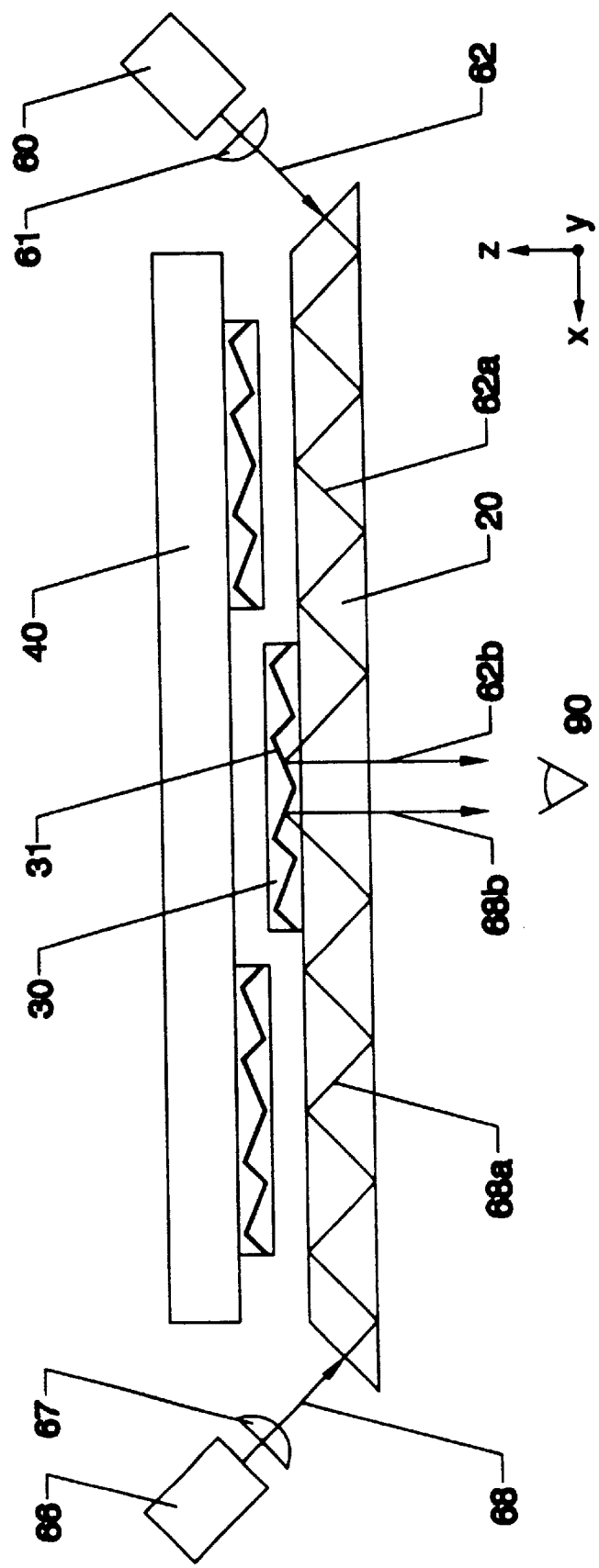
FIG. 20 illustrates a double-light-source arrangement.

Many variations and applications of the disclosed display device are possible. FIG. 20 illustrates a variation of the disclosed display device. Two light sources 60 and 66, preferably being identical, are deployed at opposite ends of a waveguide core 20. The reflector 31 in a light switch 30 is shaped in such a way that the left half of the reflector 31 reflects the light beam 68a coming from the left side and the right half of the reflector 31 reflects the light beam 62a coming from the right side. The advantages of this modification include doubled brightness of the display and reduced light-switch-speed requirement as compared with a single-side-light-source display of the same size and the same resolution. Therefore, this technique is particularly suitable for making large area, very high resolution, and high brightness panel displays.

Variations in light-coupling methods are possible. For example, light coupling between an array light source and channel waveguides or between an array photodetector and channel waveguides may be accomplished by the use of optical fibers. In this case the array light source and the array photodetector would not have to be placed in an immediate vicinity of the waveguides. In addition, the array light source and the array photodetector may not even have to be in a linear physical form. They can be arranged into any appropriate physical form as long as a one-to-one connection between individual elements of the arrays and individual waveguide channels is established.

Variations of waveguides are possible. For example, the present invention is not limited to the use of channel waveguides. A single slab of transparent materials, forming a planar waveguide, may be used. In this case, the best operation mode may be achieved when a collimated light source, such as a laser, is used. Moreover, display panels of this invention do not have to be flat and rigid. Curved and flexible display panels are possible when corresponding waveguides, front and back plates are made curved and/or flexible. Curved display panels may produce special visual sensation and find uses in various applications. Flexible display panels may be rolled into small packages for easy carrying.

The actuation of the light switches may be achieved by using driving mechanisms other than electrostatic force. For example, a piezoelectrical mechanism may be used to serve the purpose of changing the gap between waveguides and switches.

A full color display may be achieved by using an array UV light source combining with phosphors either coated on the front plate or embedded in the light switches. In this embodiment, waveguides and light switches should be made of UV transparent materials, such as glasses and dielectrics.

Figure 21:
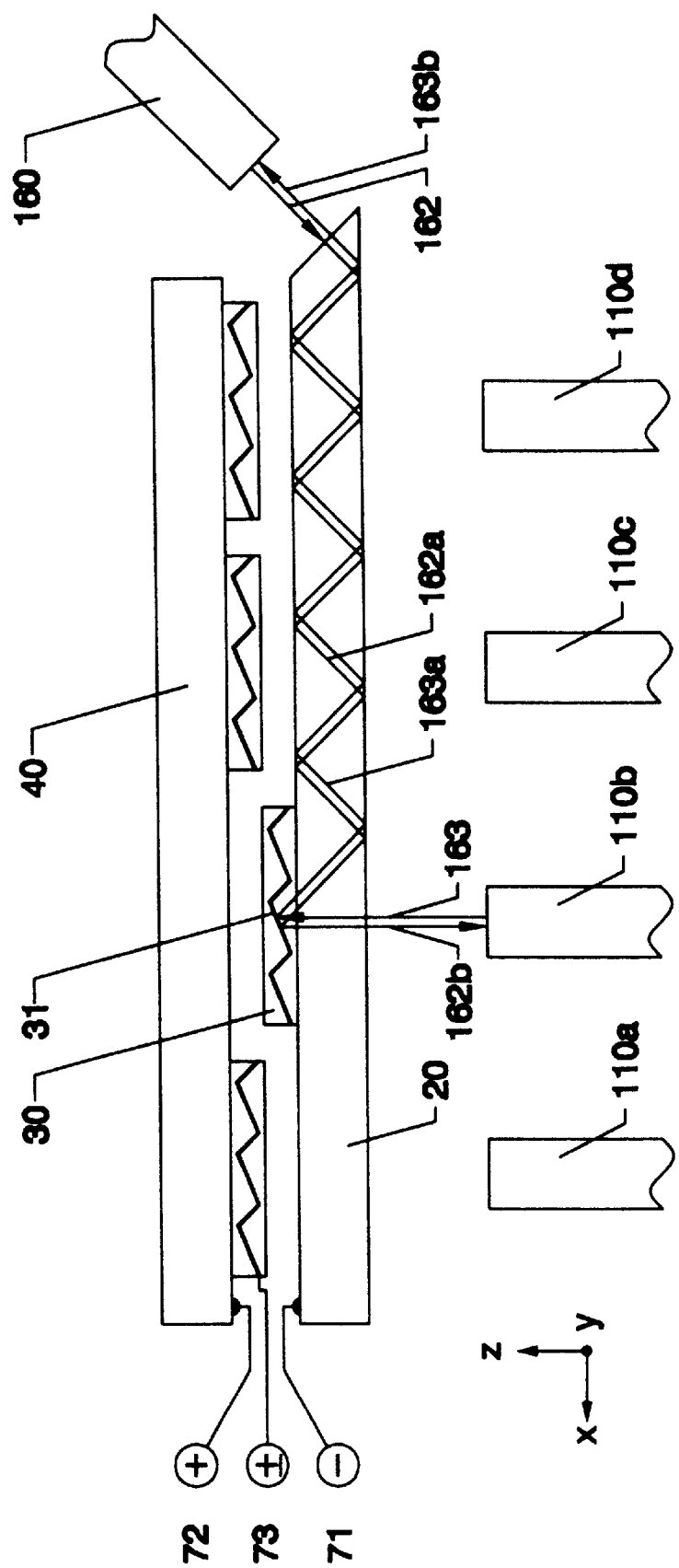
FIG. 21 illustrates a relaying device for optical fibers.

The present invention may be used to construct optical devices other than displays. FIG. 21 illustrates a relay device for optical fibers. The device contains two optical ports. One optical port is a single-end terminal, located at the end of a waveguide core 20, as shown being connected to an optical fiber 160 in FIG. 21. Another optical port is a multiple terminal, located along front side of the waveguide core 20, as shown being connected to optical fibers 110a to 110d in FIG. 21. Optical signals 162 and 163, which may consist of laser beams, are relayed between the two ports. The operational principle of this optical relaying device is the same as that of the previously described interactive display device shown in FIG. 14. Reflective light switches 30 are preferred for this optical relay device. To operate properly, the disclosed device permits only one designated light switch 30 to be turned on at any given time. When a single channel waveguide is used, the device shown in FIG. 21 is a 1×4 relay. An n×m (n and m being any positive integers of reasonable values) relay can be built when n channel waveguides and m light switches are used. This type of optical device may find applications in the field of optical fiber communication.

Obviously many modifications and variations of this invention are possible in the light of the above teachings. It is therefore to be understood that within the scope of the appended claims the invention may be practiced otherwise than as specifically described.

Example 1

Diffusive Light Switch Device

A working device based on the use of diffusive light switch shown in FIG. 6C was fabricated as follows. Glass plates of 0.5 mm thick were used as planar waveguides for this device. On a glass plate a 1000-Å thick ITO film and a 1000-Å thick $SiO_2$ film were deposited using a sputtering process. The ITO and the $SiO_2$ films served as a waveguide electrode and an insulating layer, respectively, as exemplified in FIG. 5B.

Light switches were fabricated by using a procedure similar to that shown in FIGS. 18A through 18C. An $ITO/SiO_2$ coated glass plate was used as substrate for the light switch fabrication. A 1.2-$\mu$m thick aluminum film was deposited on the substrate surface as a sacrificial layer. The deposition was performed in an electron-beam evaporator. A mixture of $TiO_2$ pigment and a polyimide precursor (Pyralin SP PI-1111 fluorinated polyamic acid from DuPont) was spin-coated on the aluminum surface. The thickness of this layer was 3.0 $\mu$m after curing. The sample was soft-baked in an oven at 140° C. for 30 minutes. The process was followed by the deposition of 200-Å Cr, 2000-Å Au, and 200-Å Cr films in an electron-beam evaporator. Of these metal films, chromium provides good adhesion to polyimide surfaces and gold provides good electrical conductivity. Photolithography was used to define light-switch electrodes and wet etching processes were used to pattern the Cr/Au/Cr metal films. A capping layer of polyimide(Pyralin SP PI-1111 fluorinated polyamic acid from DuPont) was spin-coated on the Cr surface. The cap layer was 3.0 $\mu$m thick after curing. The sample was soft-baked in an oven at 140° C. for 30 minutes and then was spin-coated with a positive photoresist. After the photoresist was exposed, light-switch patterns were developed in a 0.27 N tetramethyl ammonium hydroxide aqueous solution at room temperature. One of the advantages of this process is that photoresist and polyimide films were developed in a single step. After the development, the unexposed photoresist film was stripped from the top of the patterned polyimide films with n-butyl acetate. The polyimide films were cured on a hot plate at 350° C. under nitrogen atmosphere. In the final steps, the Al sacrificial layer was removed in a 15% HCl aqueous solution. The sample was thoroughly rinsed in water, dipped into methanol to replace the water, and spin-dried. A 1.2-$\mu$m gap was created between the light switches and the planar waveguide.

LEDs were used as light source and were coupled with a planar waveguide at an incident angle of 45° through right-angle glass prisms, which were bonded to the waveguides with a clear epoxy.

Voltage biases were applied between light-switch electrodes and a waveguide electrode. In this particular device no back plate and, therefore, no back plate electrode was used. The "on" state of a light switch was set by applying a 10-volt bias to the light-switch electrode while holding the waveguide electrode at ground level. The "off" state of a light switch was set by applying a 0-volt bias to the light-switch electrode while holding the waveguide electrodes at ground level. Light extraction and spatial modulation were demonstrated.

EXAMPLE II

Reflective Light Switch Device

A working device based on the use of reflective light switches shown in FIG. 6A was fabricated and demonstrated. Parallel channel waveguides were fabricated by mechanical means, staring with a transparent acrylic plate. A milling machine was used to form deep and parallel trenches on the acrylic plate. The trenches formed the waveguide claddings and the remaining portion of the plate formed waveguide cores. The sidewalls of the waveguide cores were mechanically polished. Referring to FIGS. 10A and 10B, the thickness and the width of the waveguide cores were $h_w$ 32 6.4 mm and $w_c$=12.7 mm.

Light switches were also made of a transparent acrylic material and were fabricated by using a milling machine and mechanical polish. The width and the thickness of the light switches were $w_s$=12.7 mm and $h_s$=2.0 mm. The reflector surface on the light switches were tilted by $\alpha$=22.5° and was coated with 2000 Å thick aluminum film. In this device, a pneumatic means was used to actuate the light switches. For the purpose of applying a pneumatic driving mechanism, holes were drilled on each light switch so that air could be pumped in and out of the space between the light switch and waveguide. When air was pumped out, a vacuum was created and the light switch was pulled towards the waveguide surface, therefore the light switch was turned on. When air was pumped in, a pressure was created and the light switch was pushed away from the waveguide surface, therefore the light switch was turned off.

LEDs were used as light source and were coupled with the waveguides at an incident angle of 45° through right-angle glass prisms, which were bonded to the waveguides with a clear epoxy. Extraction and spatial modulation of light waves from channel waveguides were demonstrated.

I claim:

1. An optical relay device comprising:
    (a) an optical waveguide having first end constituting a single-terminal optical port and a front side constituting a multiple-terminal optical port;

(b) a predetermined number of light switches in proximity to said optical waveguide, said light switches containing optical means for reflecting light waves;

(c) finite and changeable gaps between said light switches and said waveguide; and (d) electrostatic means for changing said gaps thereby actuating said light switches and relaying optical signals between two said ports.

* * * * *